United States Patent
Castellano et al.

(10) Patent No.: US 11,078,302 B2
(45) Date of Patent: Aug. 3, 2021

(54) POLYMERIZATION METHODS

(71) Applicant: North Carolina State University, Raleigh, NC (US)

(72) Inventors: Felix N. Castellano, Raleigh, NC (US); Nancy Awwad, Raleigh, NC (US); Anh Thy Bui, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 111 days.

(21) Appl. No.: 16/407,756

(22) Filed: May 9, 2019

(65) Prior Publication Data

US 2019/0345269 A1 Nov. 14, 2019

Related U.S. Application Data

(60) Provisional application No. 62/669,632, filed on May 10, 2018.

(51) Int. Cl.
| | |
|---|---|
| *C08F 2/48* | (2006.01) |
| *C08F 20/34* | (2006.01) |
| *C08F 20/40* | (2006.01) |
| *C08F 20/18* | (2006.01) |
| *B01J 35/00* | (2006.01) |
| *B01J 31/18* | (2006.01) |
| *B29C 64/291* | (2017.01) |
| *B33Y 80/00* | (2015.01) |
| *B33Y 10/00* | (2015.01) |
| *B33Y 70/00* | (2020.01) |

(52) U.S. Cl.
CPC .............. *C08F 2/48* (2013.01); *B01J 31/1815* (2013.01); *B01J 35/004* (2013.01); *B29C 64/291* (2017.08); *C08F 20/18* (2013.01); *C08F 20/34* (2013.01); *C08F 20/40* (2013.01); *B01J 2531/025* (2013.01); *B01J 2531/26* (2013.01); *B33Y 10/00* (2014.12); *B33Y 70/00* (2014.12); *B33Y 80/00* (2014.12); *C08F 2438/03* (2013.01)

(58) Field of Classification Search
CPC .............. C08F 2438/03; C08F 222/103; C08F 220/20; C08F 120/14; C08F 20/40; C08F 20/34; C08F 20/18; C08F 2/48; B33Y 80/00; B33Y 70/00; B33Y 10/00; B01J 2531/26; B01J 2531/025; B01J 35/004; B01J 31/1815; B29C 64/291
See application file for complete search history.

(56) References Cited

U.S. PATENT DOCUMENTS 6,750,266 B2 6/2004 Bentsen et al.
2004/0198857 A1 10/2004 Dejneka et al.

OTHER PUBLICATIONS

Hab Dika,,Near-infrared photopolymerization: Initiation process assisted by self-quenching and triplet-triplet annihilation of excited cyanine dyes. Chemical Physics Letters, vol. 515, Issues 1-3, 2011, pp. 91-95, (Year: 2011).*
Awwad, "Photochemical Upconversion Induced Polymerization, Presentation", North Carolina State University, Feb. 2017.
Awwad, et al., "Photon Upconversion Induced Polymerization, poster", North Carolina State University, Mar. 2017.
Cahalan, et al., "Two-photon tissue imaging: seeing the immune system in a fresh light", Nature Reviews Immunology 2002, 2, 872-880.
Cardona, et al., "Electrochemical considerations for determining absolute frontier orbital energy levels of conjugated polymers for solar cell applications", Adv. Mater. 2011, 23, 2367-2371.
Cumpston, et al., "Two-photon polymerization initiators for three-dimensional optical data storage and microfabrication", Nature 1999, 398, 51-54.
Haefele, et al., "Getting to the (Square) Root of the Problem: How to Make Noncoherent Pumped Upconversion Linear", J. Phys. Chem. Lett. 2012, 3, 299-303.
Martir, et al., "Photoinduced electron transfer in supramolecular ruthenium-porphyrin assemblies", Dalton Trans. 2017, 46, 2255-2262.
Parker, et al., "Sensitized anti-Stokes delayed fluorescence", Proc. Chem. Soc 1962, 386-387.
Parker, et al., "Triplet-singlet emission in fluid solutions: Phosphorescence of eosin", Trans Faraday Soc, 1961, 57, 1894-1904.
Singh-Rachford, et al., "Photon upconversion based on sensitized triplet-triplet annihilation", Coord. Chem. Rev. 2010, 254, 2560-2573.
Stelmakh, et al., "Delayed fluorescence from the upper excited electronic states of metallopophyrins", Opt. Spektrosk. 1980, 49, 511-516.
Wang, et al., "3D printing of polymer matrix composites: A review and prospective", Composites Part B 2017, 110, 442-458.
Yu, et al., "Ultrafast Dynamics of Porphyrins in the Condensed Phase: II. Zinc Tetraphenylporphyrin", J. Phys. Chem. A 2002, 106, 9845-9854.
Ballard et al. Photochemical ionogenesis in solutions of zinc octaethyl porphyrin. J Chem Phys, 1980, 72, 933.

* cited by examiner

*Primary Examiner* — Sanza L. McClendon
(74) *Attorney, Agent, or Firm* — Meunier Carlin & Curfman LLC

(57) ABSTRACT

Disclosed herein are methods of forming (co)polymers from polymerizable compositions, the methods comprising irradiating the polymerizable compositions with light, wherein the polymerizable compositions comprise a polymerization initiator having an absorption band and exhibiting triplet-triplet annihilation up-conversion and a monomer. Also disclosed herein are methods of additive manufacturing using the methods of forming (co)polymers described herein.

22 Claims, 40 Drawing Sheets

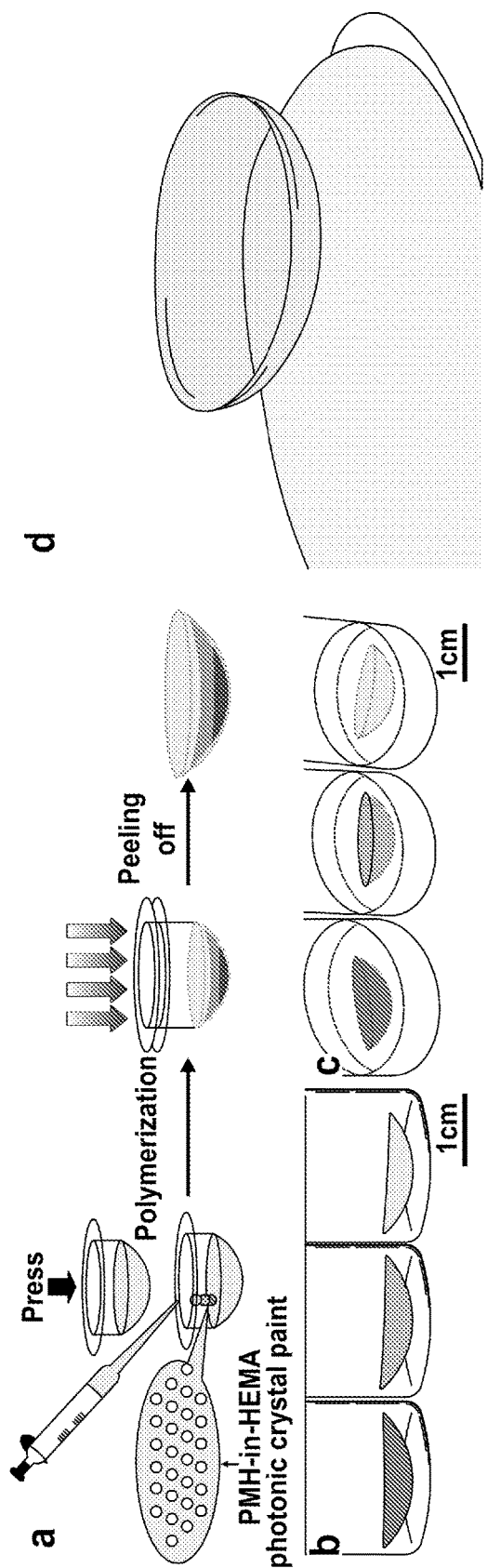
*Figure 6a-d*
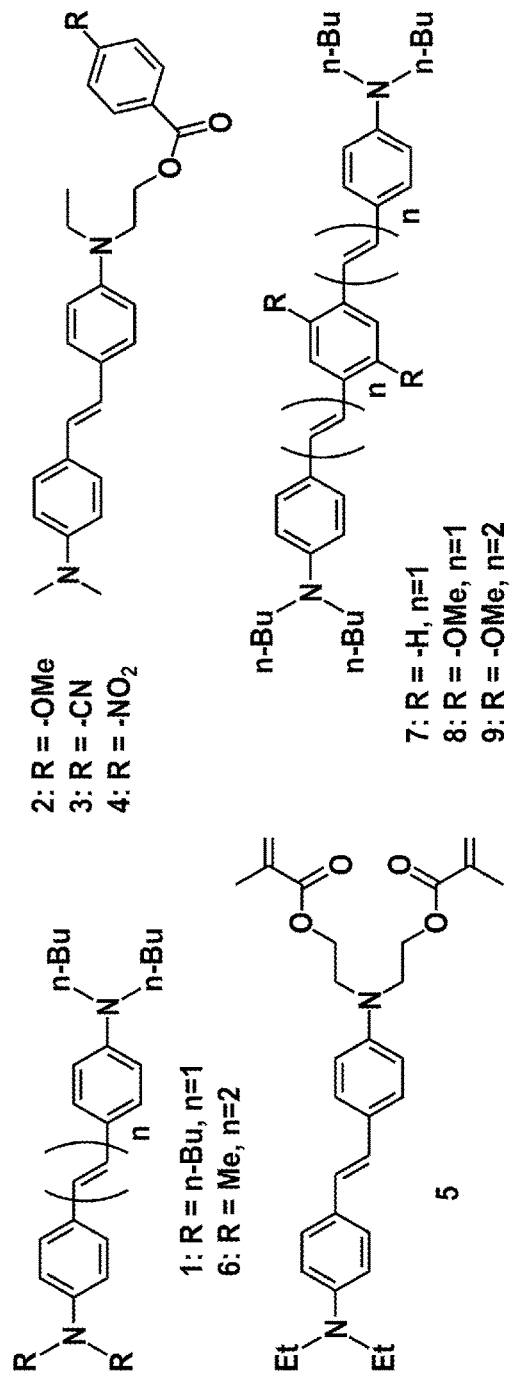
*Figure 7*

1: R = n-Bu, n = 1

ISC: Intersystem Crossing
TTET: Triplet-Triplet Energy Transfer
TTA: Triplet-Triplet Annihilation ZnTPP 1) $S_0(ZnTPP) + h\nu_{(514nm)} \rightarrow S_1(ZnTPP)$ 2) $S_1(ZnTPP) \rightarrow T_1(ZnTPP)$ 3) $2T_1(ZnTPP) \rightarrow S_1(ZnTPP) + S_0(ZnTPP)$ 4) $S_1(ZnTPP) \rightarrow S_0(ZnTPP) + h\nu_{(upconverted)}$

POLYMERIZATION METHODS

CROSS-REFERENCE TO RELATED APPLICATIONS

This application claims the benefit of priority to U.S. Provisional Application No. 62/669,632, filed May 10, 2018, which is hereby incorporated herein by reference in its entirety.

BACKGROUND

Synthesis of (co)polymers by free radical, cationic, step-growth, and increasingly emerging controlled/living radical polymerizations enabled by photoinduced electron transfer reactions can be realized utilizing chromophore groups in the presence of co-initiator compounds. Traditionally, using these reactions, the photo-activation of acrylate monomers to produce myriad (co)polymer products requires the input of either high-energy ultraviolet (UV) light or requires sophisticated molecules designed to absorb near-infrared light through simultaneous two-photon excitation to prepare micron-scale objects such as photonic crystals and microfluidic devices. The use of either high-energy ultraviolet (UV) light or sophisticated molecules designed to absorb near-infrared light through simultaneous two-photon excitation can contribute to high costs associated with these methods. A need exists for lower cost photopolymerization methods. The methods described herein address these and other needs.

SUMMARY

In accordance with the purposes of the disclosed devices and methods, as embodied and broadly described herein, the disclosed subject matter relates to polymerization methods.

Additional advantages of the disclosed devices and methods will be set forth in part in the description which follows, and in part will be obvious from the description. The advantages of the disclosed devices and methods will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

FIG. 6a-d shows a representative application of the photopolymerization methods for fabricating contact lenses.

FIG. 7 shows some example molecules that can absorb near-infrared light through simultaneous two-photon excitation.

DETAILED DESCRIPTION

Figure 1:
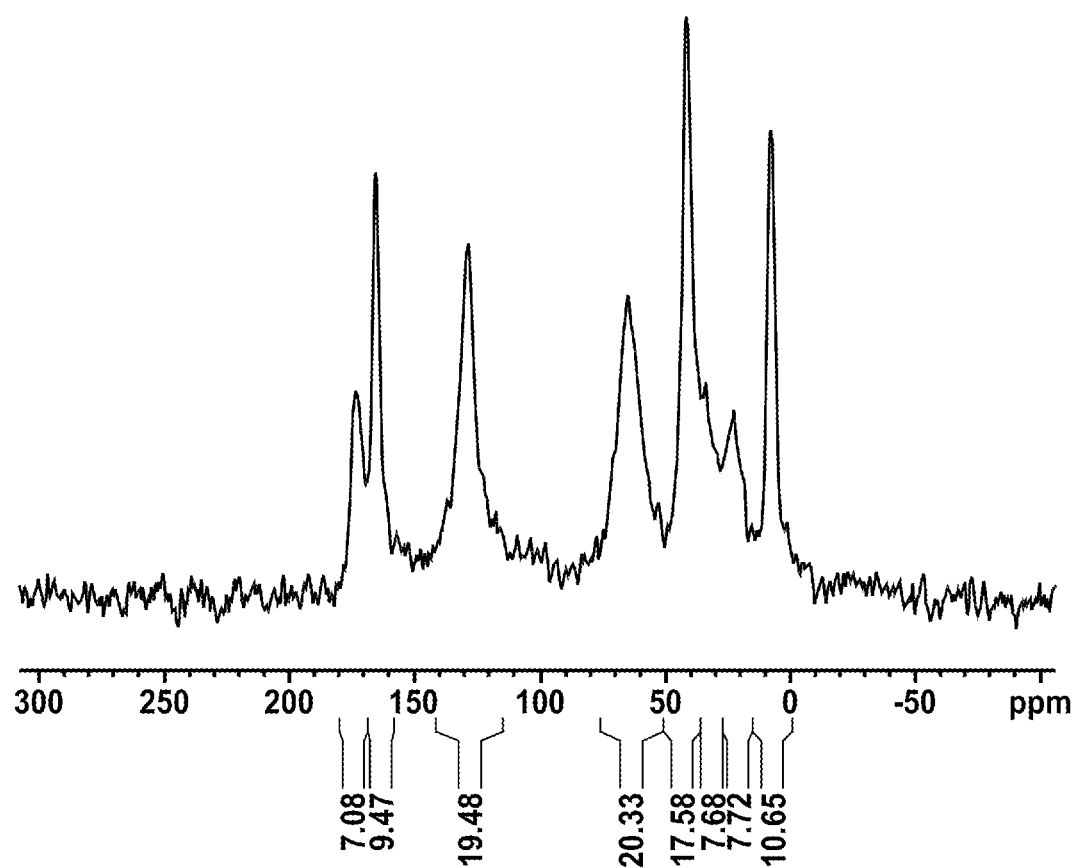
FIG. 1 shows the $^{13}C$ NMR spectrum of the solid polymer synthesized under blue LED irradiation of a solution of $3\times10^{-5}$ M ZnTPP in TMPTA.

The compositions, devices, and methods described herein may be understood more readily by reference to the following detailed description of specific aspects of the disclosed subject matter and the Examples and Figures included therein.

Before the present compositions, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value.

By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "(meth)acryl . . . " includes "acryl . . . ," "methacryl . . . ," or mixtures thereof.

The term "(co)polymer" includes homopolymers, copolymers, or mixtures thereof.

Disclosed herein are methods of forming (co)polymers from polymerizable compositions, the methods comprising irradiating the polymerizable compositions with light, wherein the polymerizable compositions comprise a polymerization initiator having an absorption band and exhibiting triplet-triplet annihilation up-conversion and a monomer.

The polymerization initiator can, for example, comprise a closed-shell metalloporphyrin complex. In some examples, the polymerization initiator comprises Zn(II) tetraphenylporphyrin (ZnTPP); meso-tetraphenylporphyrin (TPP); 5,10,15,20-tetraphenyl-21H,23H-porphine nickel(II) (NiTPP); 5,10,15,20-tetrakis(4-methoxyphenyl)-21H,23H-porphine cobalt(II) (CoTMPP); 5,10,15,20-tetrakis(4-methoxyphenyl)-21H,23H-porphine iron(III) chloride (FeTMPP); palladium(II) octaethylporphyrin (PdOEP); or a combination thereof. In some examples, the polymerization initiator comprises Zn(II) tetraphenylporphyrin (ZnTPP); palladium(II) octaethylporphyrin (PdOEP); or a combination thereof. In some examples, the polymerization initiator comprises Zn(II) tetraphenylporphyrin (ZnTPP). In some examples, the polymerization initiator comprises palladium(II) octaethylporphyrin (PdOEP).

The monomer can, for example, comprise an ethylenically unsaturated monomer. In some examples, the monomer comprises at least one acrylate end group. In some examples, the monomer comprises a (meth)acrylate monomer. In some examples, wherein the monomer comprises a tri(meth)acrylate monomer. In some examples, the monomer comprises trimethylolpropane triacrylate (TMPTA), ethoxylated trimethylolpropane triacrylate (EO-TMPTA), tris(2-hydroxyethyl) isocyanurate triacrylate (THEITA), (meth)acrylate, methyl (meth)acrylate, or a combination thereof.

In some examples, the polymerizable compositions can further comprise a solvent. The solvent can, for example, comprise toluene, tetrahydrofuran (THF), dimethyl sulfoxide (DMSO), or a combination thereof.

In some examples, the polymerizable compositions can further comprise a reversible addition-fragmentation chain transfer (RAFT) agent. The RAFT agent can, for example, comprise a thiocarbonylthio compound, such as 2-(dodecylthiocarbonothioylthio)propionic acid (DTPA).

The light irradiating the polymerizable composition can, for example, have an energy that is less than the absorption band of the polymerization initiator. In some examples, the light irradiating the polymerizable composition has an energy that does not substantially overlap with the absorption band of the polymerization initiator. In some examples, the light irradiating the polymerizable composition has an energy that at least partially overlaps with the absorption band of the polymerization initiator.

The light can, for example, have an energy lower than that of ultraviolet light. In some examples, the light comprises visible light. In some examples, the light comprises low power visible light. For example, the light can have a power of 500 mW or less (e.g., 450 mW or less, 400 mW or less, 350 mW or less, 300 mW or less, 250 mW or less, 200 mW or less, 150 mW or less, 100 mW or less, or 50 mW or less). In some examples, the light can comprise blue light (e.g., light at one of more wavelengths from 450 nm to 495 nm), green light (e.g., light at one or more wavelength from 495 nm to 570 nm), or a combination thereof.

In some examples, the polymerization initiator comprises a metalloporphyrin complex having a Q-band and the light irradiating the polymerizable composition excites the Q-band of the metalloporphyrin complex. In some examples, the polymerization initiator comprises ZnTPP and the light comprises green light.

The light irradiating the polymerizable composition can, for example, be provided by a light source. The light source can be any type of light source. Examples of suitable light sources include natural light sources (e.g., sunlight) and artificial light sources (e.g., incandescent light bulbs, light emitting diodes, gas discharge lamps, arc lamps, lasers, etc.). In some examples, the light source can comprise an Argon ion laser, a He/Ne laser, a diode laser, a light-emitting diode, a lamp, or a combination thereof.

In some examples, irradiating the polymerizable composition causes the polymerization initiator to undergo triplet-triplet annihilation up-conversion to induce polymerization of the monomer. For example, irradiating the polymerizable composition can cause the polymerization initiator to undergo homomolecular triplet-triplet annihilation up-conversion or heteromolecular triplet-triplet annihilation up-conversion. In some example, wherein irradiating the polymerizable composition causes the polymerization initiator to undergo heteromolecular triplet-triplet annihilation up-conversion, the polymerization initiator can comprise a sensitizer and an emitter.

In some examples, irradiating the polymerizable composition causes the polymerization initiator to produce a radical and wherein the radical induces polymerization of the monomer.

In some examples, wherein the polymerizable composition further comprises a RAFT agent, irradiating the polymerizable composition causes the polymerization initiator to form a radical that induces reversible addition-fragmentation chain transfer (RAFT) polymerization of the monomer.

For example, also disclosed herein are methods of forming a (co)polymer from a polymerizable composition, the method comprising: irradiating the polymerizable composition with light, wherein the polymerizable composition comprises: a polymerization initiator having an absorption band and exhibiting triplet-triplet annihilation up-conversion; a reversible addition-fragmentation chain transfer (RAFT) agent; and a monomer; and wherein irradiating the polymerizable composition causes the polymerization initiator to form a radical that induces reversible addition-fragmentation chain transfer (RAFT) polymerization of the monomer.

In some examples, the methods can further comprise depleting oxygen from the polymerizable composition prior to irradiation. Depleting oxygen from the polymerizable composition can, for example, comprise bubble degassing the polymerizable composition with an inert gas, using a freeze-pump-thaw method, contacting the polymerizable composition with an oxygen scavenger, or a combination thereof. In some examples, depleting oxygen from the polymerization composition comprises contacting the polymerizable composition with an oxygen scavenger, and the oxygen scavenger comprises dimethylfuran (DMF).

Also disclosed herein are methods of forming an object via additive manufacturing, the method comprising: irradiating a first quantity of a polymerizable composition on a substrate to induce polymerization of a monomer into a first layer on the substrate using any of the methods described herein; and forming at least one additional layer on the first layer by irradiating at least a second quantity of the polymerizable composition to induce polymerization of the monomer into the at least one additional layer on the first layer using any of the methods described herein, thereby forming the object.

Also disclosed herein are methods of producing a three-dimensional structure using additive manufacturing, the method comprising forming the three-dimensional structure on a layer-by-layer basis using any of the methods described herein.

Also disclosed herein are articles of manufacture comprising a (co)polymer formed using any of the methods described herein, an object formed using the methods of forming an object via additive manufacturing described herein, or a three-dimensional structure formed using the any of the methods of producing a three-dimensional structure described herein. The article of manufacture can, for example, comprise a photonic crystal, a microfluidic device, a photovoltaic, a photochromic display, a compact disc, a dental (co)polymer, an adhesive, an automotive part, plastic flooring, a thin film coating, a disposable syringe, an intravenous bag, sterile packaging for a medical instrument, a joint replacement, a tissue scaffold, a contact lens, a fiber optic, a transdermal patch, a microneedle array, or a combination thereof.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Normally, photo activation of acrylate monomers requires either the input of ultraviolet light to produce large area plastic objects (compact discs, dental (co)polymers, adhesives, automotive parts, etc.) or sophisticated molecules designed to absorb near infrared light through simultaneous two-photon excitation. In the case of the latter, the two-photon excitation process with an ultrafast high peak power titanium-sapphire laser enables three-dimensional writing/scribing of plastic microscale to nanoscale objects within a laser scanning microscope.

Photochemical upconversion can operate within the same "quadratic" two-photon regime offering three-dimensional resolution but does not require the input from a high peak-power laser system. Rather the photochemical upconversion process operates at low power/low light fluence (laser pointer output power) and can even function using terrestrial solar photons or other non-coherent light sources. Photochemical upconversion operating through sensitized triplet-triplet annihilation (TTA) can initiate polymerization in a variety of acrylates and triacrylate monomers using low energy visible photons.

Photon upconversion based on TTA is the most commonly utilized energy mechanism for realizing delayed fluorescence. It represents a regenerative process by which higher energy photons with respect to the incident light are generated. This emerging technology is of interest due to its potential applications in oxygen sensing, biological imaging, and photosensitive devices, including photovoltaics, photocatalyst systems, photochromic displays, and others. The most commonly utilized energy mechanism for realizing upconverted fluorescence works via heteromolecular TTA, a multicomponent process (different donor and acceptor molecules). A second reported scheme involves homomolecular TTA that follows a similar mechanism involving two molecules, yet the latter two are of the same compound. In essence, homomolecular TTA uses a single species as both the sensitizer and emitter.

The methods described induced polymerization in a formulation including only a porphyrin (ZnTPP) and a monomer by an electron transfer process without any co-initiator. These methods take advantage of the ability of some metalloporphyrins to both undergo a homomolecular TTA process and an electron transfer process in presence of the monomers: this process uses photochemical upconversion based on sensitized TTA, which combines the energy stored in two excited metalloporphyrin molecules into one, thereby enabling the high-energy chemistry necessary to initiate free-radical polymerization in liquid acrylate monomers.

Photochemical upconversion occurring between two excited Zn(II) tetraphenylporphyrin (ZnTPP) molecules initially excited with green light generates a high energy excited state (termed the S2 excited state in ZnTPP) that initiates polymerization in triacrylate monomers resulting in the formation of macroscopic plastic objects constructed within the photolyzed area of the solution. This polymerization process can be initiated with other metalated porphyrins, such as palladium(II) octaethylporphyrin (PdOEP), and combinations of metalated porphyrins and triplet acceptor molecules, where the latter molecules engage in triplet-triplet annihilation. In addition, similar photo-initiated polymerization occurs in acrylate monomers including trimethylolpropane triacrylate (TMPTA), ethoxylated (6) trimethylolpropane triacrylate (EO-TMPTA) and tris(2-hydroxyethyl) isocyanurate triacrylate (THEITA). This method enables visible-light activation of photopolymerization processes and can lower the costs necessary for micro- and nano-fabrication of materials and value added manufacturing, which, in turn, can potentially develop new markets for specialized plastics and plastic-containing products. The lowered cost for the methods described herein can be due to the lowered cost (e.g., from approx. $200K to $100) of the necessary light source to drive the photochemistry for micro- and nano fabrication (laser pointer vs. high peak-power ultrafast laser). The methods described herein permits visible light to be used to construct larger macroscopic objects.

The methods described herein use a polymerizable composition integrating photochemical upconversion, comprising a polymerization initiator and a polymerizable resin, wherein said initiator is capable of both undergoing a homomolecular triplet-triplet annihilation process and generating a radical, and said resin contains a solvent and at least one monomer structure. The upconverting polymerization initiator can be a metalloporphyrin complex, and the resin monomeric components include at least one acrylate end group.

For example, the polymerizable compositions can comprise:

ZnTPP+trimethylolpropane triacrylate (TMPTA)+toluene or THF;

ZnTPP+ethoxylated (6) trimethylolpropane triacrylate (EO-TMPTA)+toluene or THF;

ZnTPP+ethoxylated (6) trimethylolpropane triacrylate (EO-TMPTA)+tris(2-hydroxyethyl) isocyanurate triacrylate (THEITA)+toluene or THF;

PdOEP+trimethylolpropane triacrylate (TMPTA)+toluene or THF; or

ZnTPP+methylacrylate+toluene.

For the polymerizable composition comprising ZnTPP+methylacrylate+toluene, evidence of quenching of the $S_2$ excited state of ZnTPP was observed from monochromatic green light excitation. This suggests that well-defined (co)polymers can be grown from the associated monomers for these compositions.

The presence of molecular oxygen can disturb the photopolymerization experiments, particularly because molecular oxygen can quench triplet states of organic molecules and prevents TTA thereby having an undesirable effect on photochemical upconversion systems, the presence of. To overcome this complication, and before polymerization using the methods described herein, the polymerization compositions were oxygen-depleted, for example by inert gas (e.g., nitrogen or argon) bubble degassing, freeze-pump-thaw method, or the addition of an oxygen scavenger to the polymerizable composition. For instance, control experiments indicated that polymerization was not observed unless degassing procedures using argon gas were applied or oxygen scavengers such as dimethylfuran (DMF) were added.

The polymerization process described herein comprises irradiating the polymerizable composition at a wavelength which is longer than the absorption band of the initiator that normally causes polymerization using a single-molecule linear process, and causing a polymerization reaction using a bimolecular upconversion process. More specifically, the methods can comprise: dissolving the upconverting initiator into the solvent, mixing the resulting solution to the resin, and applying an irradiation technique to excite the low-energy absorption band of the initiator. Using a metalloporphyrin such as ZnTPP, this corresponds to an excitation into the Q-band (instead of the $S_2$ band) of the oxygen-free polymerizable composition with an Argon ion laser, a He/Ne laser, a diode laser, a light-emitting diode, or visible-light excitation lamps.

The excitation source for the Q-band excitation can, for example, be selected from:

$Ar^+$ laser: for macroscale polymerization;

Microscope laser excitation (Ar, He/Ne laser): uses focused laser excitation for microfabrication purposes;

Monochromatic Xe lamp excitation: for thin macroscale polymerization on the surface of the cuvette;

Light emitting diode excitation: for macroscopic polymerization; and

Laser diode excitation: for small area polymerization.

Experiments were conducted to examine free radical polymerization using TTA process in the polymerizable composition. The experiments comprised exciting the Q-band of the oxygen free resin formulation to induce polymerization. Using an argon laser, polymerization was observed along the light path. When the laser beam was focused through a microscope objective, direct laser writing was performed thanks to a focal-point localized polymerization and spatial translations of focal point by galvanometric mirrors or by a translation stage. Using a Xe lamp, polymerization was demonstrated on a broad surface, where the resin was exposed. Similar results were obtained using light emitting diodes and laser diodes.

As a control, solutions containing only the monomer TMPTA in degassed toluene were excited at 514.5 nm using the argon laser for 10-20 minutes and polymerization was not observed. This suggests that the presence of ZnTPP is essential to induce the polymerization at this wavelength.

By changing the monomer or the mixture of monomers used in the resin, one can change some characteristics of the final (co)polymer. In this way, some properties of the (co)polymer can be tailored and objects with well-controlled shapes can be fabricated. For example, (co)polymer hardness and the amount of shrinkage the material undergoes due to polymerization can be controlled. Also, the mixture of monomers can increase the viscosity of the resin which confines the diffusion of the ZnTPP triplet states and limits the uncontrolled polymerization. Aa more confined reaction space, for example by using a spacer placed on the microscope slide with a cover slip on top of the spacer, can be used to limit the evaporation of the antioxidant DMF and the diffusion of oxygen into the resin, which can in turn reduce the inhibition rate of the polymerization.

Possible applications for the methods described herein include, but are not limited to, 3D printing; micro- and nanofabrication, such as those developed for the fabrication of plastic objects such as compact discs, dental (co)polymers, adhesives, automotive parts, plastic flooring, thin film coatings, etc.; and applications where utilization of visible light (as opposed to ultraviolet light) for photochemical polymerization is beneficial. The methods described herein can be extended to work in aqueous media to produce biologically-relevant (co)polymers.

In recent years, the global production of plastic resins is about 300 MMT annually. This number will almost certainly continue to increase in the future given the outstanding societal benefits plastics provide. The two major processes used to produce plastics are called polymerization and polycondensation, and they both require specific catalysts. In a polymerization reactor, monomers like ethylene and propylene are linked together to form long (co)polymers chains. Each (co)polymer has its own properties, structure and size depending on the various types of basic monomers used. Also, plastics are malleable, versatile, cost-effective, require less energy to produce than alternative materials—such as metal or glass—which makes it a versatile and durable material for a range of different products. Some manufacturers actually prefer plastic fabrication over working with other materials due to the process's advantages in certain applications. Due to these characteristics, (co)polymers are used in diverse health applications, such as disposable syringes and intravenous bags, sterile packaging for medical instruments as well as in joint replacements, tissue engineering, etc.

TTA-based polymerization methods described herein employ low-cost pre-polymer substrates and simple (co)polymer processing techniques that are amenable to plastic objects mass production. These methods could be beneficial in the fabrication of the applications mentioned above and is of particular interest due to its low-price lasers and energy employed. For several microfabrication methods, including TTA-based polymerization, the cost may be significantly lower than macro-scale systems, for example, the required sample volumes, analysis times, and consumption of reagents and analytes can be greatly reduced.

Example 2

In the past ten years, 3D printing technology has advanced so rapidly that the previously unknown manufacturing technique has become a billion-dollar industry. Today, 3D printers pervade many industries and employs photopolymerization as their commonly used technique.

Figure 2:
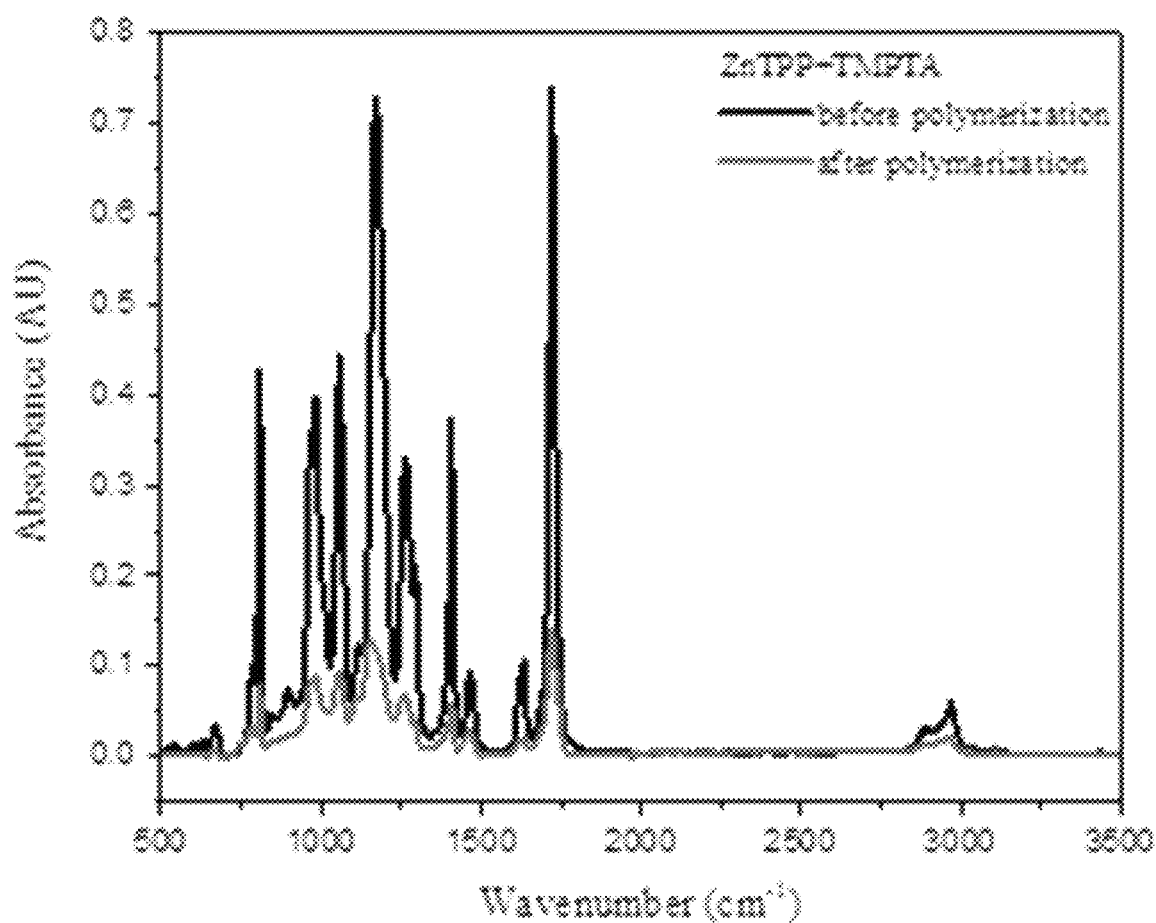
FIG. 2 shows IR spectrum of the pre-polymer solution of $3\times10^{-5}$ M ZnTPP in TMPTA and the solid polymer synthesized under blue LED irradiation of the latter.

Described herein is the study of photon upconversion via triplet-triplet annihilation (TTA) in pre-polymer systems. This upconversion mechanism was verified in polymerization processes by electron transfer initiation. First, homomolecular TTA was studied in zinc tetraphenylporphyrin (ZnTPP) in toluene. Here, ZnTPP acts as both the sensitizer and upconverting emitter as TTA yields an $S_2$ excited porphyrin. Upon addition of a monomer, trimethylolpropane triacrylate (TMPTA), an electron can be transferred from the higher excited state $S_2$ of ZnTPP and induce the polymerization. The electron transfer was demonstrated by $S_2$ fluorescence quenching with a relatively large ultrafast quenching rate constant, $k_q=9.3\times10^{11}$ $M^{-1}$ $s^{-1}$, the appearance of electronic absorption bands due to the radical cation of ZnTPP growing around 450 nm and at longer wavelengths from 600 nm, and the absence of quenching from the $S_1$ fluorescence and triplet excited state of ZnTPP. FIG. 1 shows the $^{13}C$ NMR spectrum of the solid (co)polymer synthesized under blue LED irradiation of a solution of $3\times10^{-5}$ M ZnTPP in TMPTA. FIG. 2 shows IR spectrum of the pre-polymer solution of $3\times10^{-5}$ M ZnTPP in TMPTA and the solid (co)polymer synthesized under blue LED irradiation of the latter.

The methods described herein for photochemical-induced polymerization utilizes low power visible light excitation that can potentially draw three-dimensional plastic objects as acrylate-based (co)polymers in real time using cheap and widely available light sources. The methods described herein uses excited state electron transfer induced polymerization using TTA process instead of the traditional two-photon excitation (TPE) technique. This mechanism can be considered as the first step towards inexpensive 3D printing approach. This result also suggests that well-controlled photo-initiated polymerization of methylacrylate and methylmethacrylate monomers is also feasible.

Figure 3:
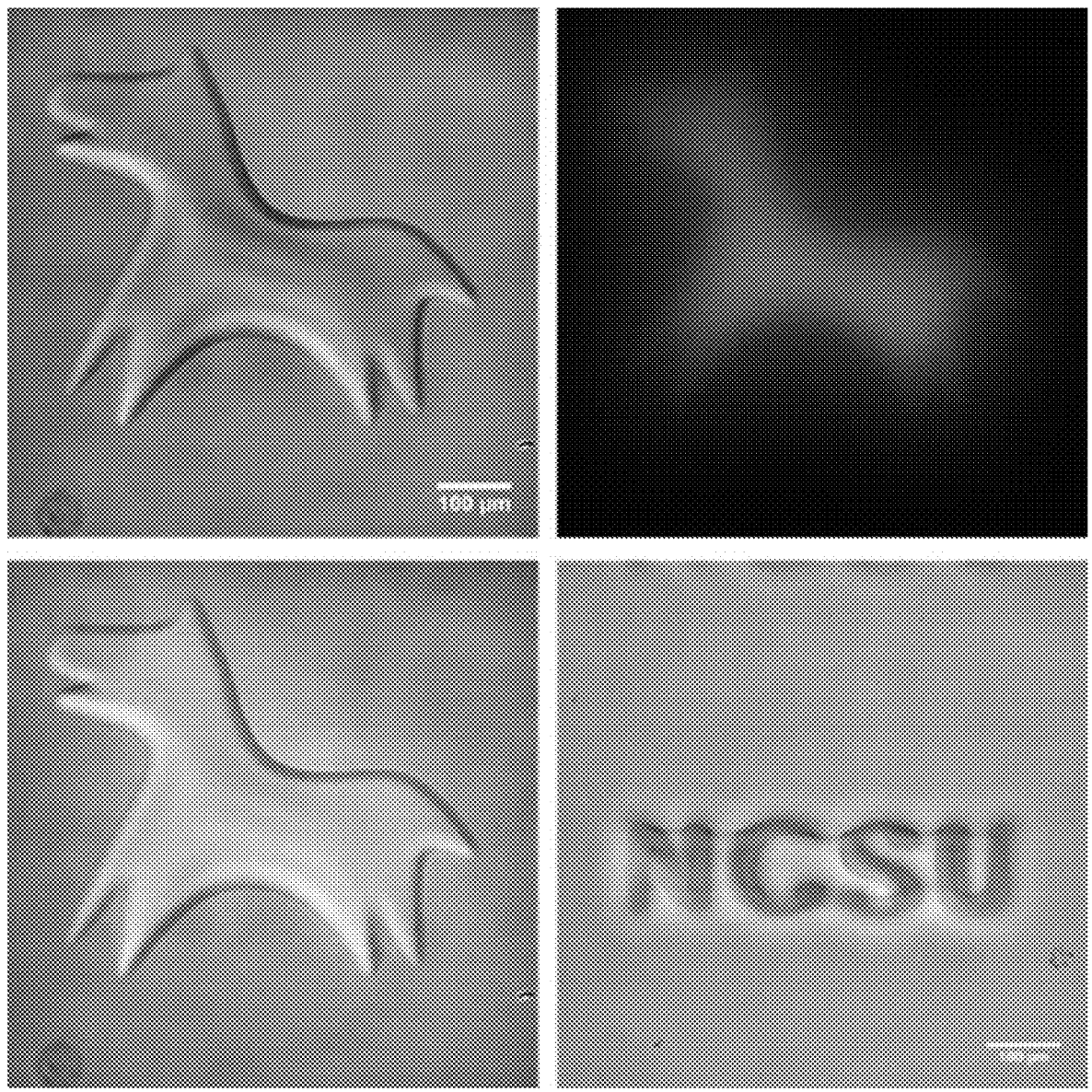
FIG. 3 shows optical images of polymerized objects obtained by direct laser writing using the TTA-based process for a formulation including TMPTA and ZnTPP. The upper left panel is a differential interference contrast image (transmitted light 633 nm), the upper right panel is a fluorescence image λ>633 nm (from species formed by degradation of ZnTPP), and the bottom left panel is a composite image of the upper left and right panels.

3D structures were fabricated by polymerization using the TTA-based process. FIG. 3 shows optical images of polymerized objects obtained by direct laser writing using the TTA-based process for a formulation including TMPTA and ZnTPP.

Figure 4:
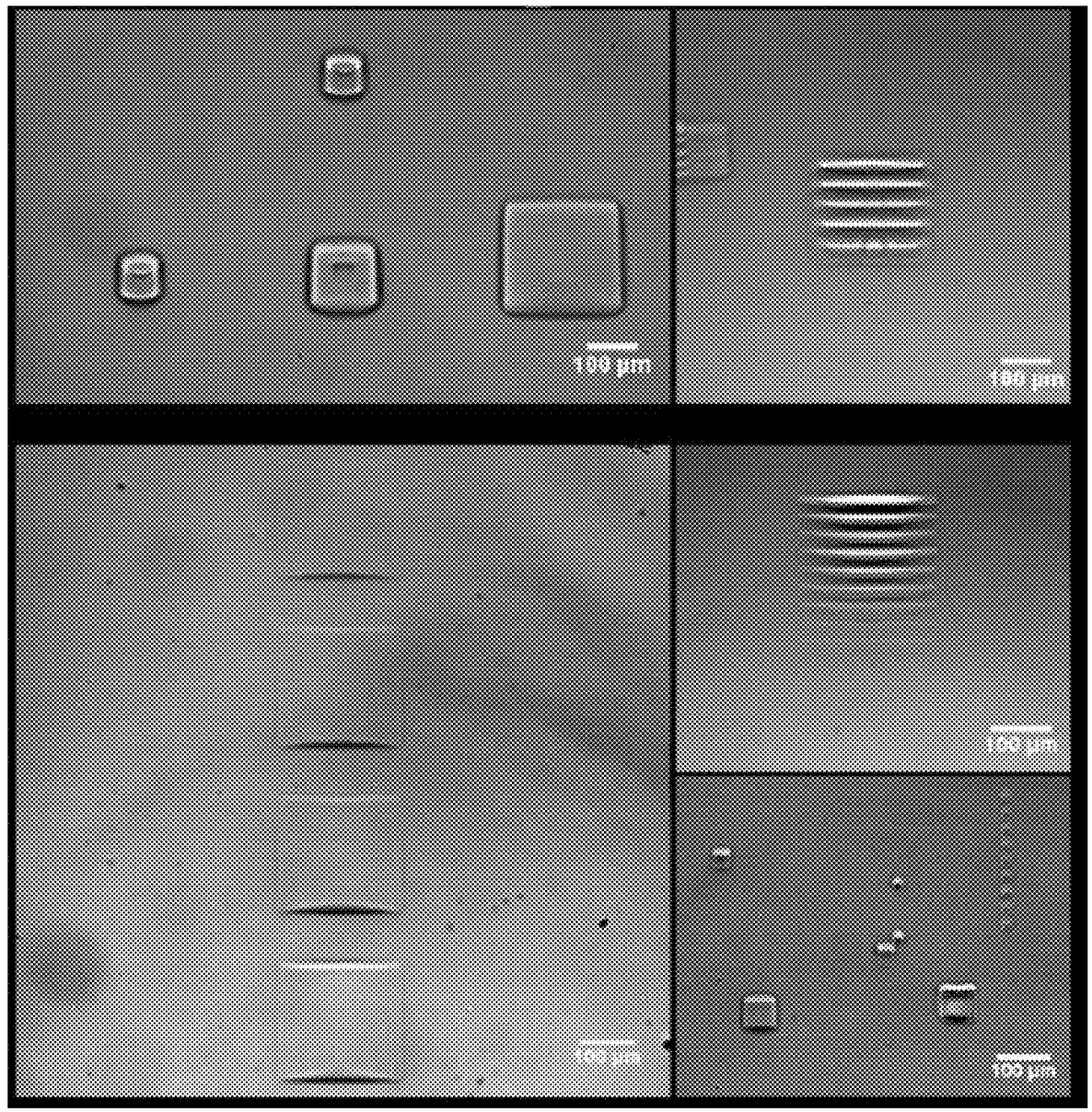
FIG. 4 shows optical images of polymerized objects obtained by direct laser writing using the TTA-based process for a formulation including TMPTA and ZnTPP.

Using a laser-scanning microscope, a 514 nm argon laser or a 543 nm He/Ne laser generated polymerized cuboids in a chambered cover glass on the microscope that were then visualized with a charge couple device (CCD) camera (FIG. 4).

Example 3

RAFT or Reversible Addition-Fragmentation chain Transfer polymerization is a form of controlled living radical polymerization enabling the construction of well defined macromolecules with complex structural architectures of predetermined molecular weight, low polydispersity, and high functionality. The RAFT polymerization process is amenable to a wide range of monomers, experimental conditions, and can be used to produce water-soluble macromolecular materials. To expand the scope of light-initiated free radical polymerization processes, the experimental results from triacrylate polymerization using low power visible light excitation, described above, were adapted to the RAFT process.

Figure 5:
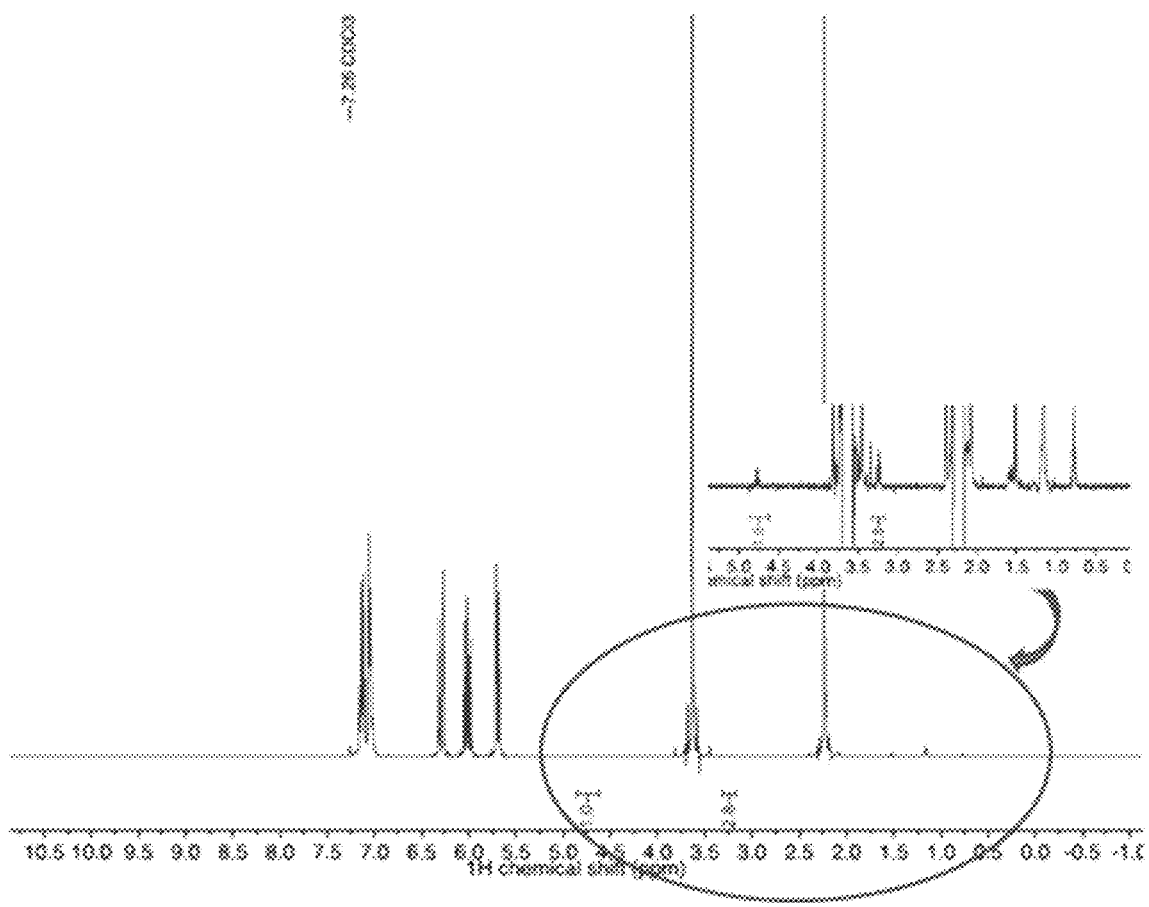
FIG. 5 shows the $^{1}H$ NMR spectrum for PMA in DMSO synthesized under blue LED light irradiation using PdOEP as the photoredox catalyst with [Monomer]:[RAFT]:[PdOEP]=200:1:1×10$^{-2}$.

For example, palladium(II) octaethylporphyrin (PdOEP) was used as a visible light photosensitizer and combined with a methacrylate monomer and the RAFT agent 2-(dodecylthiocarbonothioylthio)propionic acid (DTPA) in either DMSO or toluene solvent. In the presence of either blue or green light excitation, this reaction mixture formed polymethacrylate, as evidenced using proton NMR spectroscopy (FIG. 5). Nearly quantitative to quantitative conversion of the monomer takes place, as confirmed by visual inspection of the final optically transparent solid formed in the reaction vessel; this final material is colored with the PdOEP chromophores. The mechanism of photoactivation appears to be either a triplet-triplet annihilation mechanism or a direct triplet energy transfer mechanism that ultimately forms the initiating radical on the DTPA RAFT agent. These experiments provide the impetus for expansion of this visible light activation photochemistry into different classes of monomers, other suitable RAFT agents, and possibly into aqueous solutions to generate water-soluble macromolecules.

The methods described herein, can, in some examples, have the ability to produce high quality macromolecules using visible light initiation and are readily adaptable for 2D and 3D printing technologies. The methods described herein are broadly applicable to numerous materials and processes, from thin films to optical quality materials.

The methods described herein use a polymerizable composition comprising a polymerization mixture of radical initiator and co-initiator/RAFT agent and a polymerizable resin, wherein said initiator is a photoredox catalyst capable of selectively activating a co-initiator compound for the living radical polymerization of methacrylates and acrylates, and said resin contains a solvent and at least one monomer structure. The polymerization initiator is a metalloporphyrin complex, the co-initiator is a thiocarbonylthio compound, and the resin monomeric components include at least one acrylate end group. This composition is oxygen-depleted by inert gas bubble degassing, freeze-pump-thaw method, or addition of an oxygen scavenger.

For example, the polymerizable composition can comprise:

PdOEP+DTPA+Methyl acrylate (MA)+toluene or DMSO; or

PdOEP+DTPA+Methyl methacrylate (MMA)+toluene or DMSO.

The polymerization process comprises irradiating the polymerizable composition at a wavelength which is longer than the absorption band of the monomer that normally causes polymerization, and initiating a free radical polymerization reaction using a RAFT process. More specifically, the methods comprise: dissolving the radical initiator and RAFT agent into the solvent, mixing the resulting solution to the resin, and applying an irradiation technique to excite the low or high energy absorption band of the initiator. Using a metalloporphyrin such as PdOEP, this corresponds to an excitation into the Q-band or Soret band of the oxygen-free polymerizable composition with an argon, He/Ne laser or visible-light excitation lamps. Photopolymerization experiments using LEDs and proton NMR characterization were conducted.

Porphyrins and their derivatives have been investigated as potential photoredox catalysts to activate a (living) radical polymerization under light such as 5,10,15,20-Tetraphenyl-21H,23H-porphine zinc (ZnTPP), meso-tetraphenylporphyrin (TPP), 5,10,15,20-tetraphenyl-21H,23H-porphine nickel (II) (NiTPP), 5,10,15,20-tetrakis(4-methoxyphenyl)-21H, 23H-porphine cobalt(II) (CoTMPP), and 5,10,15,20-tetrakis (4-methoxyphenyl)-21H,23H-porphine iron(III) chloride (FeTMPP), etc. Depending on the metal ions in the core of the porphyrins, different catalytic activity for the polymerization of MMA and MA are displayed. The difference in the catalytic activity was attributed to their photophysical properties upon excitation.

The present work reports the study of the suitability of PdOEP as photoredox catalysts for the activation of photoinduced electron transfer—reversible addition—fragmentation chain transfer (PET-RAFT) polymerization. Mechanistically, the polymerization process is initiated by a radical source (PdOEP) as in conventional radical polymerizations. In the presence of the RAFT agent (DTPA), the propagating radical adds to the RAFT agent to form a radical intermediate which can subsequently fragment to generate a new initiating radical and a thiocarbonylthio-containing (co)polymer chain. The radical formed can initiate new (co) polymer chain growth to form a new propagating radical. The "main RAFT equilibrium" of activation—deactivation is established by degenerative chain transfer between propagating and dormant (co)polymer chains. In the presence of either blue or green light excitation, this reaction mixture forms polymethacrylate as evidenced using proton NMR spectroscopy and nearly quantitative to quantitative conversion of monomer takes place by visual inspection of the final optically transparent viscous liquid formed in the reaction vessel; this final material is colored with the PdOEP chromophores.

Polymerization of MA/MMA were carried out in the presence of DTPA and PdOEP under blue and green light for 24 hours. Exposure to light for less than 24 hours didn't consume all the acrylate present in solution and polymerization is not obvious: prolonged exposure to light is crucial. Additionally, PdOEP is slightly soluble in DMSO.

These methods are different from the triplet annihilation photochemistry methods described above. A compelling feature of photoinitiated controlled polymerizations is the ability of establishing on-demand control of the process both in terms of temporally manipulating the polymerization reaction as well as gaining spatial control. Thus, fabrication of 3D (co)polymeric structures and functional patterned surfaces can be obtained in a controlled manner using photochemistry. Similar to conventional free radical polymerization, RAFT uses a radical initiator to add to a double bond and initiate the polymerization. However, distinctive from conventional free radical polymerizations is the use of a chain transfer agent, which is also referred to as the RAFT agent, to carry on the polymerization in a controlled manner. The methods described herein can be used to synthesize of well-defined macromolecular architectures. Some micro/nanofabrication processes and technologies have been developed for the fabrication of plastic objects such as compact discs, dental (co)polymers, adhesives, automotive parts, plastic flooring, thin film coatings, etc. and the methods described herein can be adapted to these micro/nanofabrication processes.

The two major processes used to produce plastics are called polymerization and polycondensation, and they both require specific catalysts. In a polymerization reactor, monomers like ethylene and propylene are linked together to form long (co)polymer chains. Each (co)polymer has its own properties, structure and size depending on the various types of basic monomers used. Also, plastics are malleable, versatile, cost-effective, require less energy to produce than alternative materials—such as metal or glass—which makes it a versatile and durable material for a range of different products. Some manufacturers actually prefer plastic fabrication over working with other materials due to the process's advantages in certain applications. Due to these characteristics, (co)polymers are used in diverse health applications, such as disposable syringes and intravenous bags, sterile packaging for medical instruments as well as in joint replacements, tissue engineering, etc. RAFT polymerization could be beneficial in the fabrication of the applications mentioned above and is of particular interest due to its low-price lamps and energy employed.

Example 4

Described herein are applications of triplet annihilation photochemistry for macro- and micro-fabrication of plastics. Representative photopolymerization applications include, but are not limited to, contact lenses (e.g., as shown in FIG. 6a-d), fiber optics, coatings, healthcare, and microfluidic devices.

In photochemical polymer synthesis methods, photoactivation of acrylate-based monomers to produce a myriad of polymer products requires either one- or two-photon excitation. One-photon excitation methods typically use high energy ultraviolet (UV) light to promote one-photon excitation; these methods can be used to produce large area plastic objects. Sophisticated molecules that absorb near-infrared light through simultaneous two-photon excitation (e.g., as shown in FIG. 7) can be used to produce micron-scale plastic structures and objects.

Figure 8:
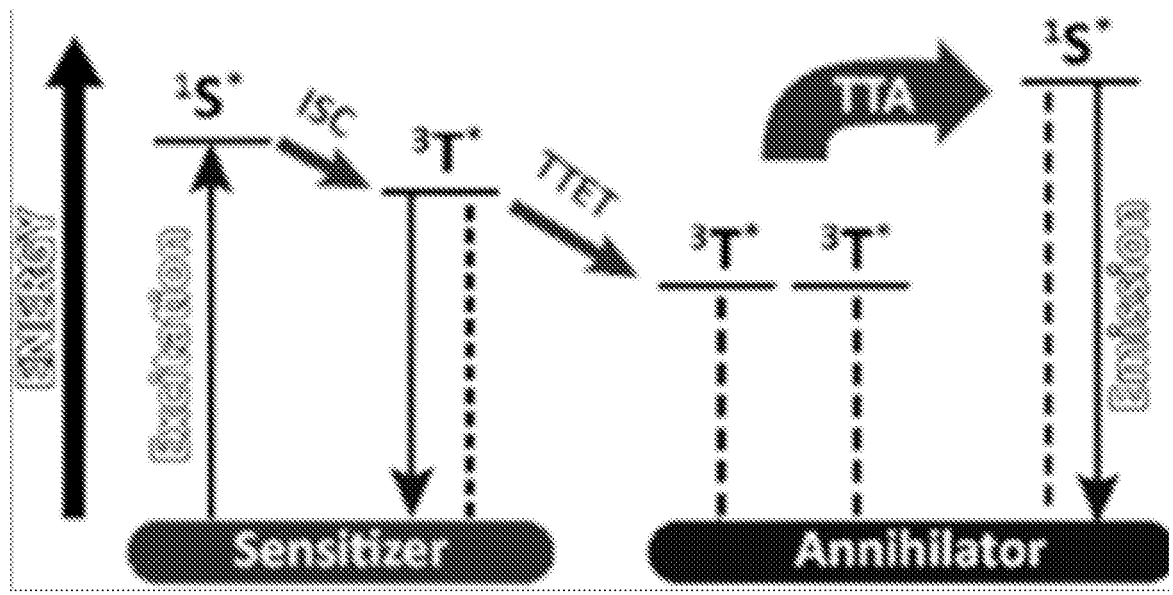
FIG. 8 shows an energy level diagram of the triplet-triplet annihilation up-conversion process.

The methods and compositions described herein relate to a photopolymerization initiation mechanism using metalloporphyrins. Low power visible light excitation can draw 2D and 3D plastic objects as acrylate-based polymers. The methods can be applied to synthesis of a wide range of macromolecules and highly functional engineered materials across different size regimes. The methods can also be applied to controlled free-radical polymerization chemistry (RAFT polymerization). Sensitized triplet-triplet annihilation in the methods described herein combines the energy stored in two excited molecules into one (FIG. 8) which can initiate free-radical polymerization in numerous monomers and can be activated with lower energy and lower power visible light sources. These methods can be used for next generation 3D scribing, which is faster, broadly deployable additive manufacturing with substantial cost reduction.

Figure 9:
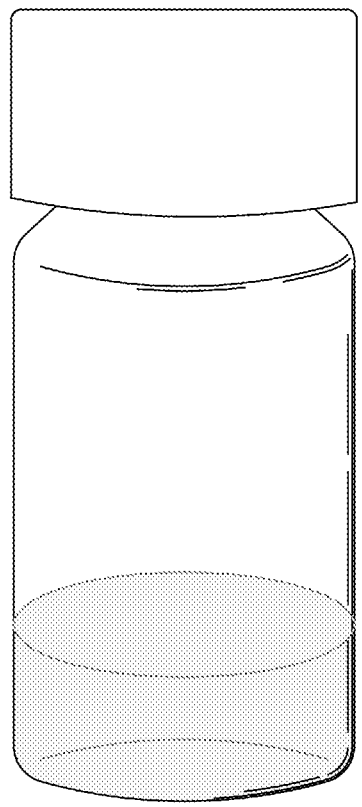
FIG. 9 is a photograph of a proof-of-principle experiment where free-radical polymerization of a triacrylate was initiated with visible light.

The methods described herein were tested in a proof-of-principle experiment to initiate free-radical polymerization of a triacrylate with visible light (FIG. 9).

The methods described herein can, for example, be used to create 3D printed microneedles, a pain-free alternative to syringes. The global transdermal drug delivery market is expected to approximate double by 2023, from $32.5B to ~$62B. The market is driven by rises in geriatric population and an upsurge in patients suffering from chronic disorders and diseases, such as diabetes. Transdermal patches can substantially reduce the costs associated with drug injection and potentially represent how annual vaccines (e.g., influenza vaccine) can be administered.

Figure 10:
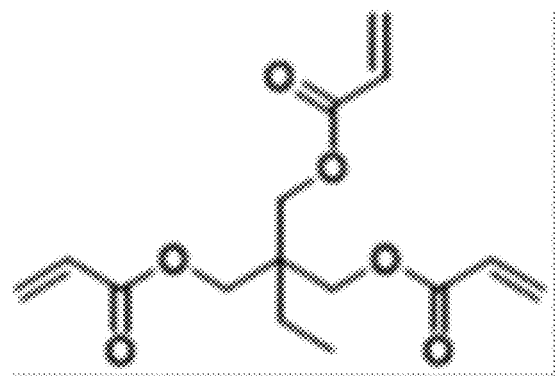
FIG. 10 shows a triacrylate monomer used in a proof-of-concept experiment for the microfabrication of soft materials on glass.
Figure 11:
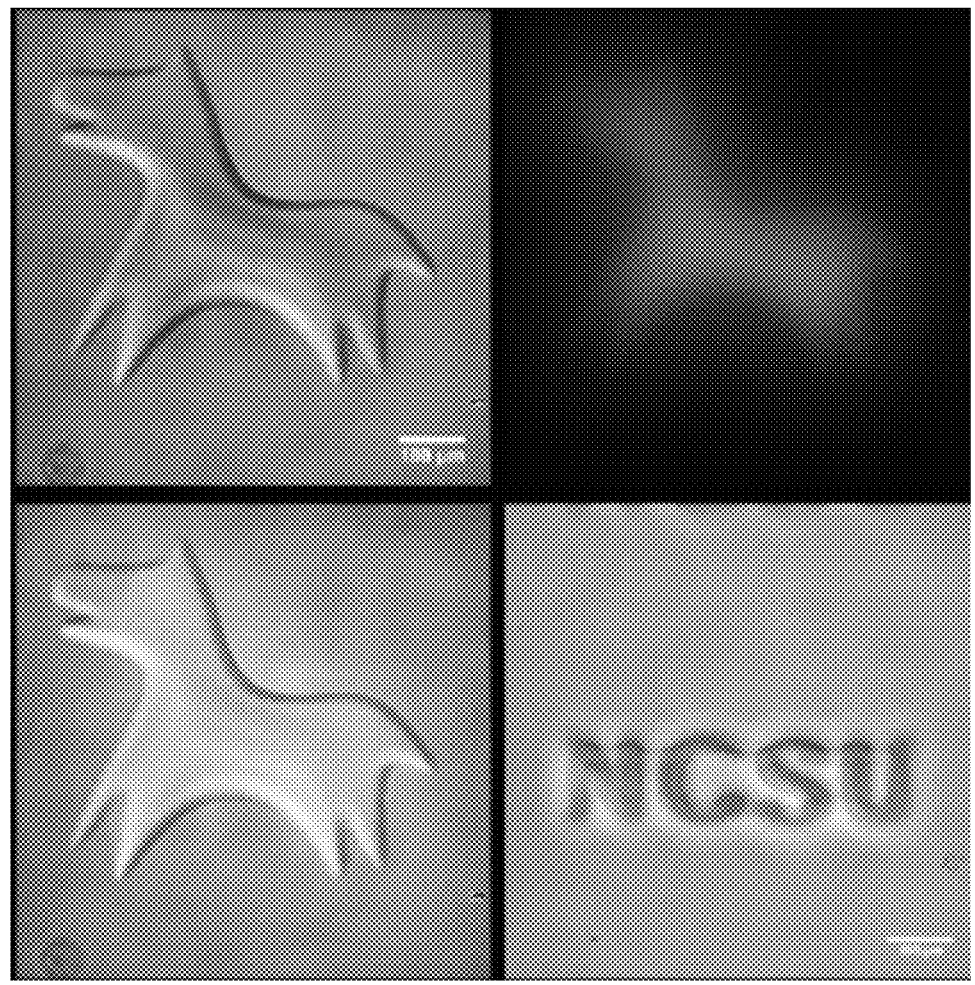
FIG. 11 shows optical images of polymerized micron scale objects obtained by direct laser writing using the monomer of FIG. 10.

As another proof-of-concept experiment, a triacrylate monomer (FIG. 10) was used in the methods described herein for the microfabrication of soft materials on glass. Optical images of polymerized micron scale objects obtained by direct laser writing using this formulation are shown in FIG. 11.

Figure 12:
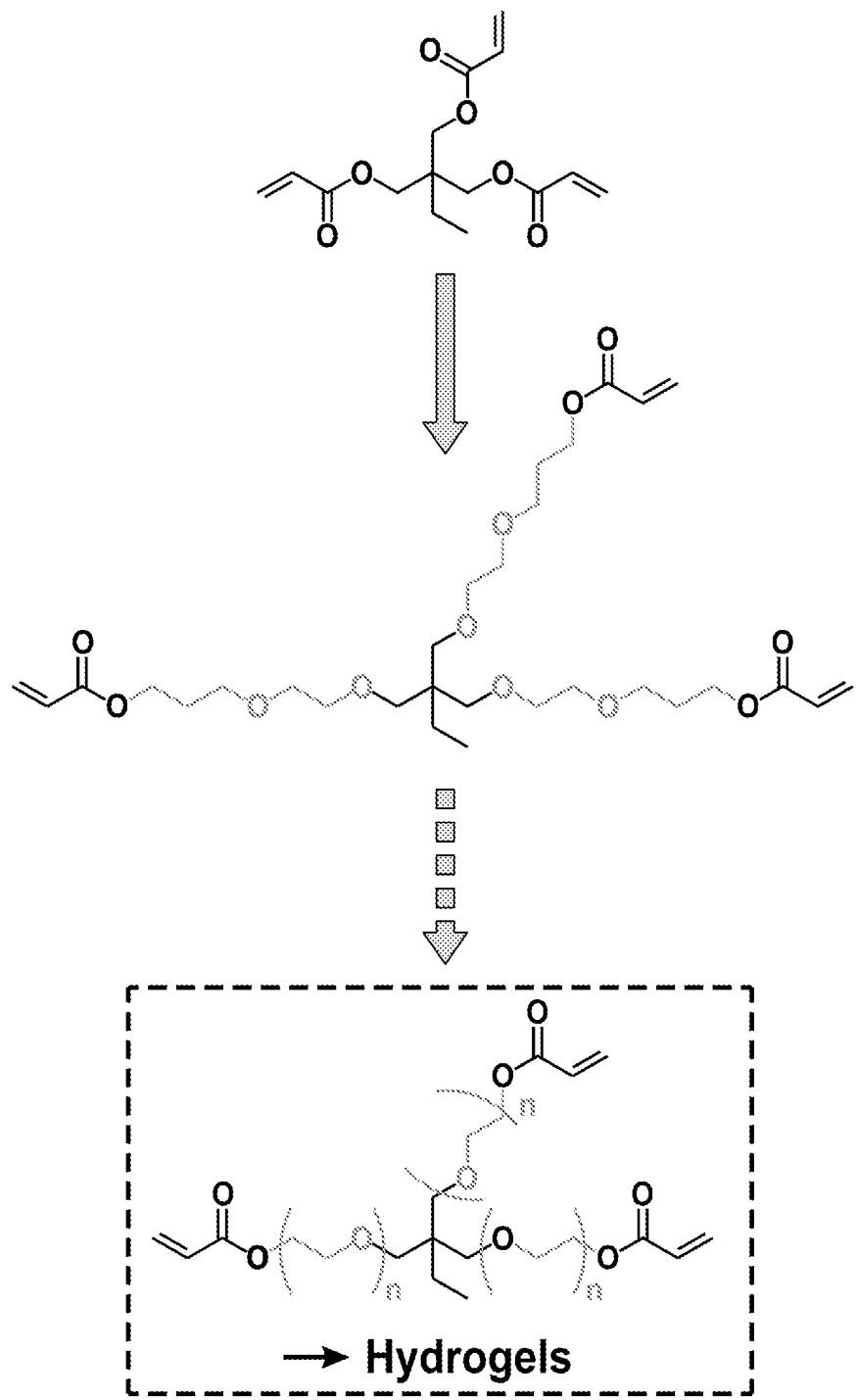
FIG. 12 shows the biocompatible hydrogel material made from the triacrylate monomer in a proof-of-concept experiment for the microfabrication of the biocompatible hydrogel material on glass.
Figure 13:
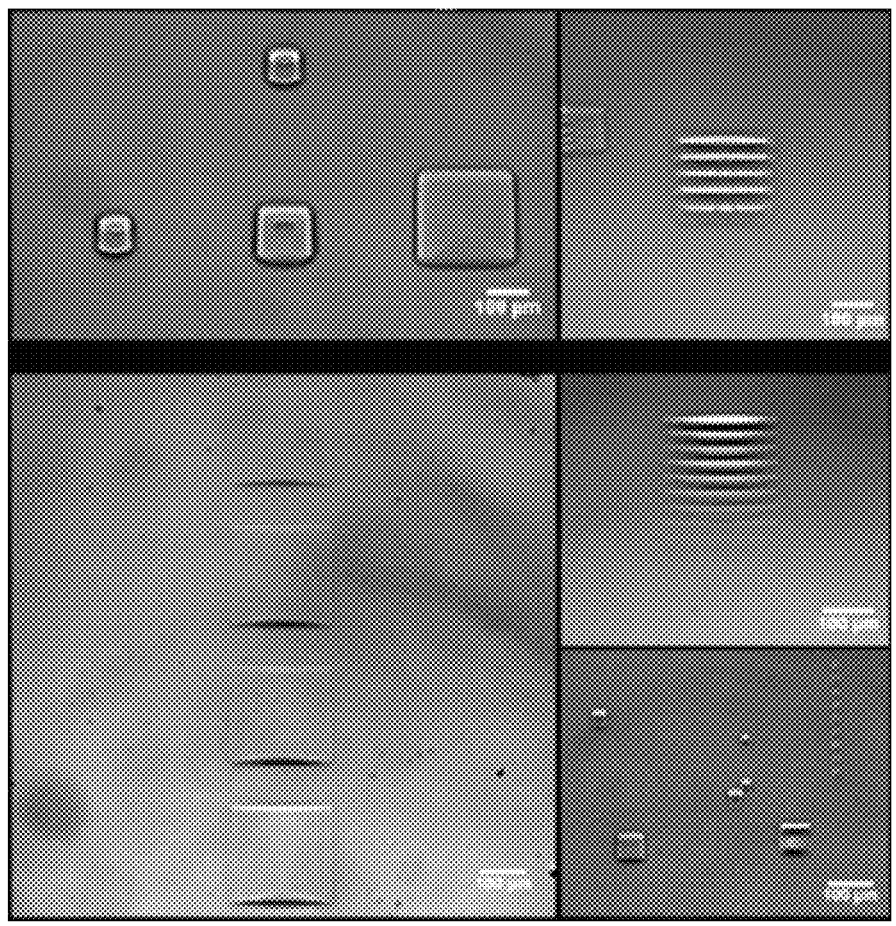
FIG. 13 shows optical images of polymerized micron scale objects obtained by direct laser writing using the formulation of FIG. 12.

As another proof-of-concept experiment, a triacrylate monomer was used in the methods described herein for the microfabrication of biocompatible hydrogel materials (FIG. 12) on glass. Optical images of polymerized micron scale objects obtained by direct laser writing using this formulation are shown in FIG. 13.

The photochemical upconversion induced polymerization methods described herein can be used for 3D printing. 3D printing includes, for example, additive manufacturing (AM), rapid prototyping (RP), and solid-freeform (SFF) methods. 3D printing is the process of joining materials to make objects from 3D modeled data on a layer-by-layer basis. 3D printing was first described in 1986 by Charles Hull. Applications of 3D printed polymers include, but are not limited to, aerospace industries for creating complex lightweight structures, architectural industries for structural models, art fields for artifact replication and education, fashion, medical fields for printing tissues and organs, and electronic devices (Wang et al. *Composites Part B: Engineering*, 2017, 110, 442-458).

The German company Nanoscribe GmbH was the first manufacturer to fabricate a complex structural design on a sub-micrometer range scale. Fabrication of 3D micro- and nanostructures in photo-sensitive materials is possible. "Direct laser writing" uses non-linear two-photon absorption processes wherein a femtosecond laser activates a photoresist and causes a chemical and/or physical change within a small volume pixel ("voxel"). By moving the sample relative to the fixed local position, precise structural elements can be written into the material.

Multi-photon excitation can be localized in three dimensions. The spatial distribution of excited fluorophores is described by Cahalan et al. (*Nature Reviews Immunology*, 2002, 2, 872-880): for one-photon excitation light is absorbed throughout a sample while for two-photon excitation light is only absorbed at the focal point.

Two-photon excitation provides a means of: activating chemical/physical processes with high spatial resolution in three dimensions; 3D fluorescence imaging; optical data storage (e.g., as described by Crumpston et al. *Nature*, 1999, 398, 51-54); and lithographic microfabrication. Photopolymer systems involving two-photon initiated polymerization of resins incorporating conventional ultraviolet-absorbing initiators can exhibit low photosensitivity and such initiators have small two-photon absorption cross sections (ζ) which can necessitate the use of high laser power. Molecules having the general structural motifs of D-π-D, D-π-A-π-D, and A-π-D-π-A have large ζ relative to the unsubstituted conjugated molecules, which is correlated with the degree of symmetric intramolecular charge transfer. As the donor substituents make the D-π-D molecules electron rich, after one- or two-photon photoexcitation these chromophores would be able to transfer an electron even to weak acceptors. This process could be used to photoactivate various chemical reactions, such as polymerization.

Figure 14:
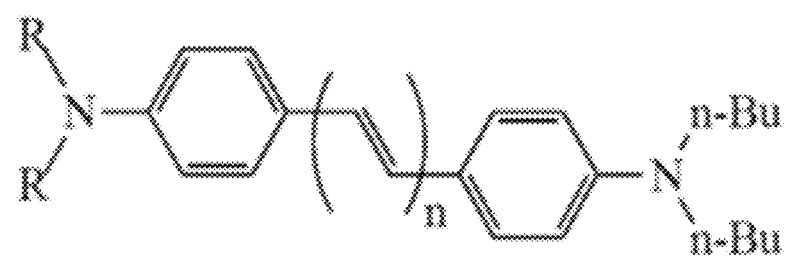
FIG. 14 shows species 1.
Figure 15:
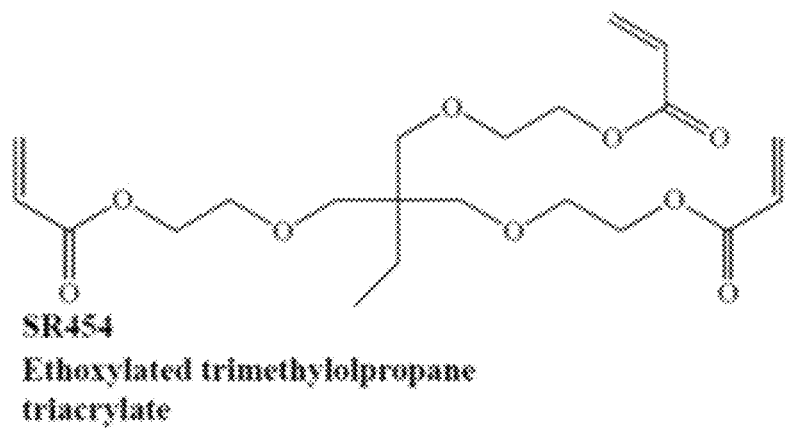
FIG. 15 shows a commercial triacrylate, SR454 from Sartomer Co.
Figure 16:
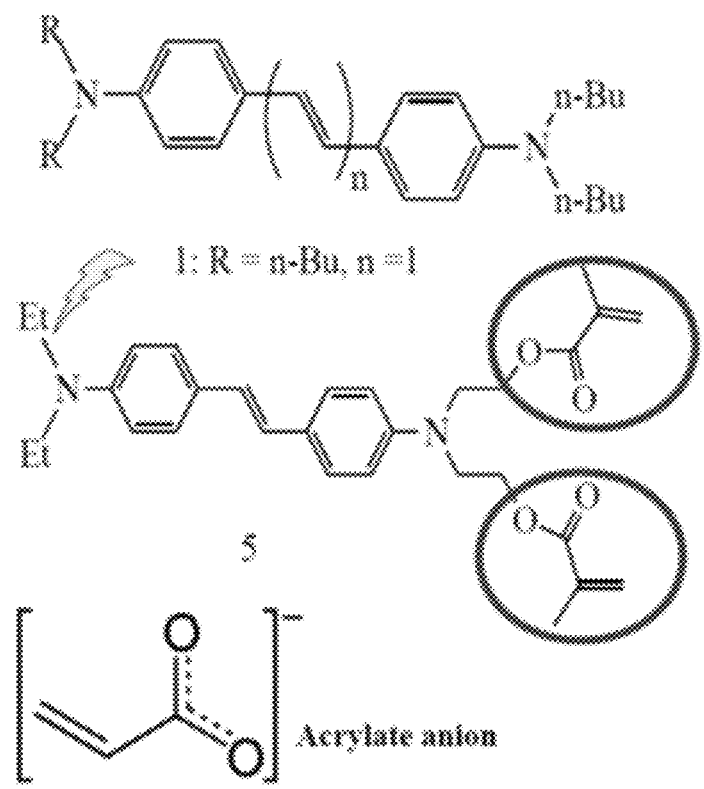
FIG. 16 shows species 5.

Efficient electron transfer from photoexcited species 1 (FIG. 14) to electron acceptors is suggested by: steady-state fluorescence quenching, fluorescence lifetime shortening, and the appearance of electronic absorptions bands due to radical cation of species 1. The $k_Q$ for photoinduced intermolecular charge transfer reactions of species 1 with acrylates in acetonitrile ($k_Q < 6 \times 10^{10}$ M$^{-1}$s$^{-1}$ for a commercial triacrylate, SR454 from Sartomer Co., FIG. 15). Chromophore+acceptor systems include amine-bound alkyl groups of species 1 replaced with an electron acceptor (species 5, FIG. 16). The fluorescence lifetime of species 5, $\tau_1$, in acetonitrile is 1.5 ns. The steady-state fluorescence intensity of species 5 in acetonitrile is reduced by a factor of 33 relative to 1, indicating the fluorescence is quenched by fast intramolecular electron transfer. Radical ions formed by electron transfer from photoexcited species 1 to an acrylate could initiate the polymerization of acrylates.

Photon upconversion is when light of long wavelengths is frequency converted to photons of higher energy. This photon upconversion can be achieved through sensitized triplet-triplet annihilation (TTA), as described for example by Singh-Rachford et al. (*Coord Chem. Rev.*, 2010, 254, 2560-2573). Parker and Hatchard observed upconverted fluoresce from donor/acceptor solution mixtures over 40 years ago (*Proc. Chem. Soc.* 1962, 373-401; *Proc. Chem. Soc.* 1962, 386-387). Photon upconversion can be used to convert low energy terrestrial solar photons into light adequate to drive excited state electron transfer.

Figure 17:
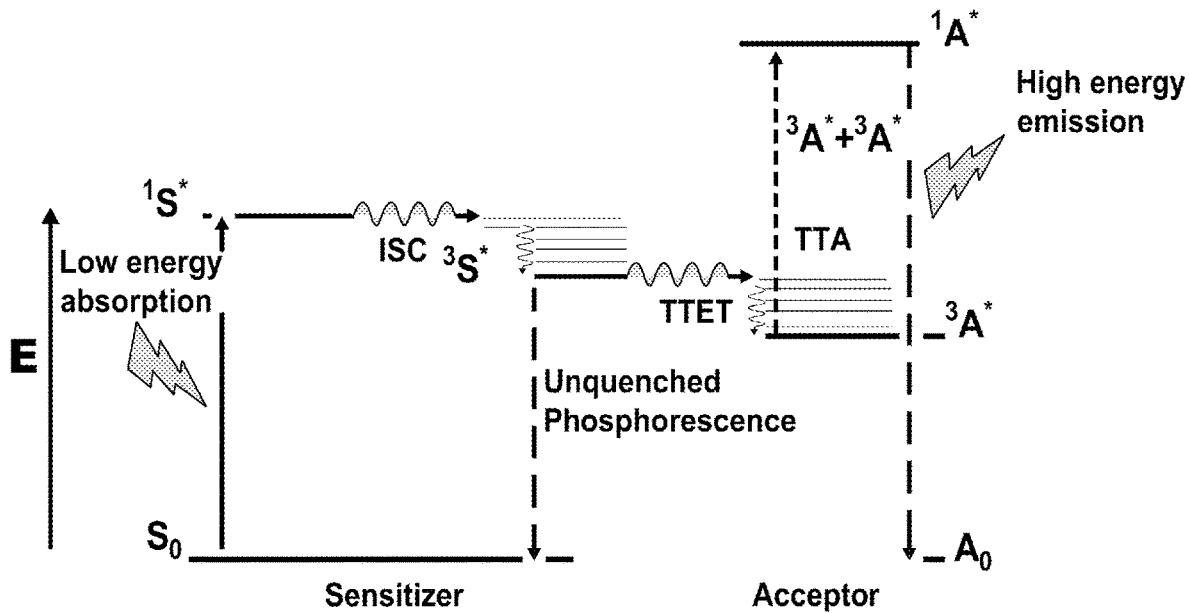
FIG. 17 is a schematic diagram showing sensitized triplet-triplet annihilation mechanism involving the transfer of energy between a sensitizer (donor) and an acceptor.

The sensitized triplet-triplet annihilation mechanism involves the transfer of energy between a sensitizer (donor) and an acceptor (FIG. 17). There are certain requirements for the sensitizer and acceptor molecules for the sensitized triplet-triplet annihilation mechanism to work. The sensitizer should absorb light in the visible-to-near-Infrared region of the spectrum, have a long triplet excited state lifetime, and have a near unity single-triplet intersystem crossing; the acceptor should have near unity fluorescence quantum yields.

Figure 18:
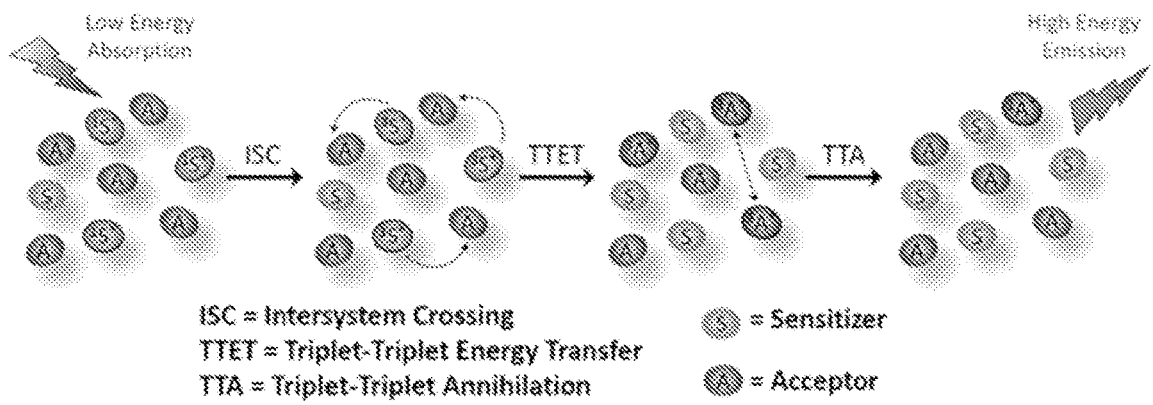
FIG. 18 is a schematic diagram of sensitized triplet-triplet annihilation.
Figure 19:
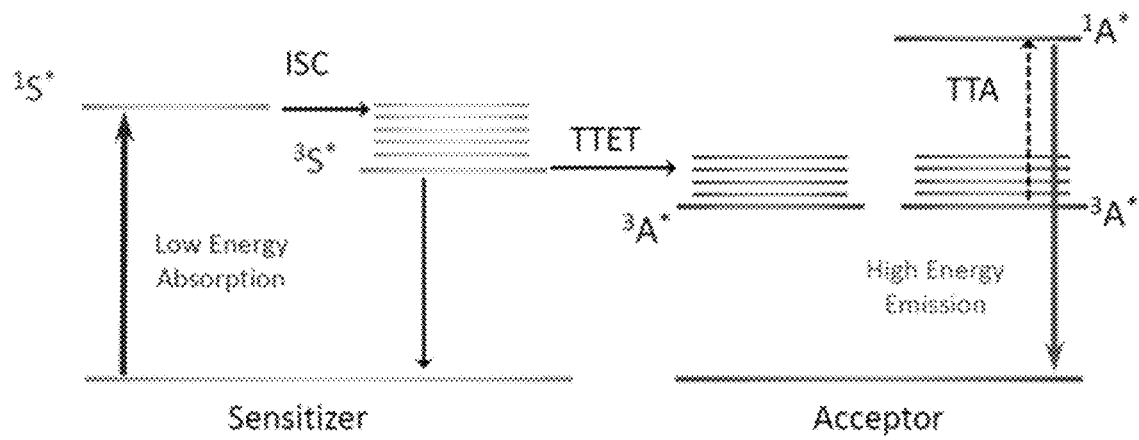
FIG. 19 is a schematic diagram of sensitized triplet-triplet annihilation.

Photon upconversion is the generation of higher energy photons from the absorption of lower energy light, usually requiring high excitation intensities. A plausible route to lower the excitation power threshold is through sensitized triple-triplet annihilation (TTA) of energetically appropriate acceptors. In sensitized TTA, the acceptor ultimately displays p-type (pyrene-type) delayed fluorescence whose intensity is proportional to the square of incident excitation power. Sensitized triplet-triplet annihilation is shown schematically in FIG. 18-FIG. 19.

Figure 20:
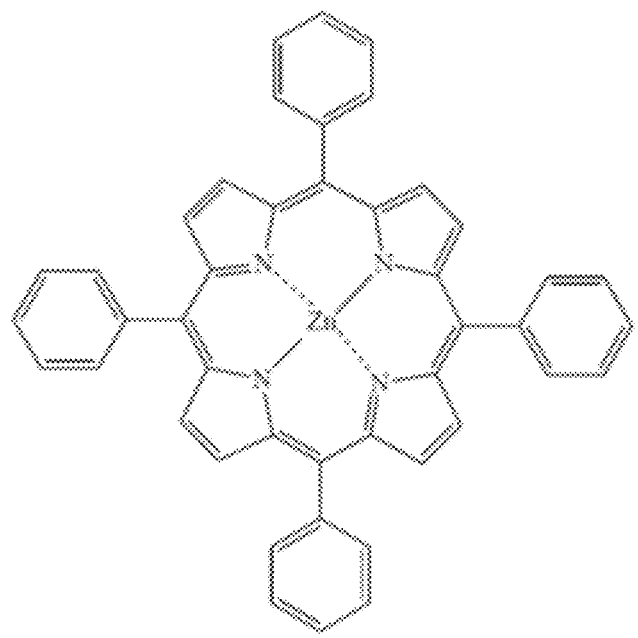
FIG. 20 shows the structure of zinc tetraphenylporphyrin (ZnTPP).
Figure 21:
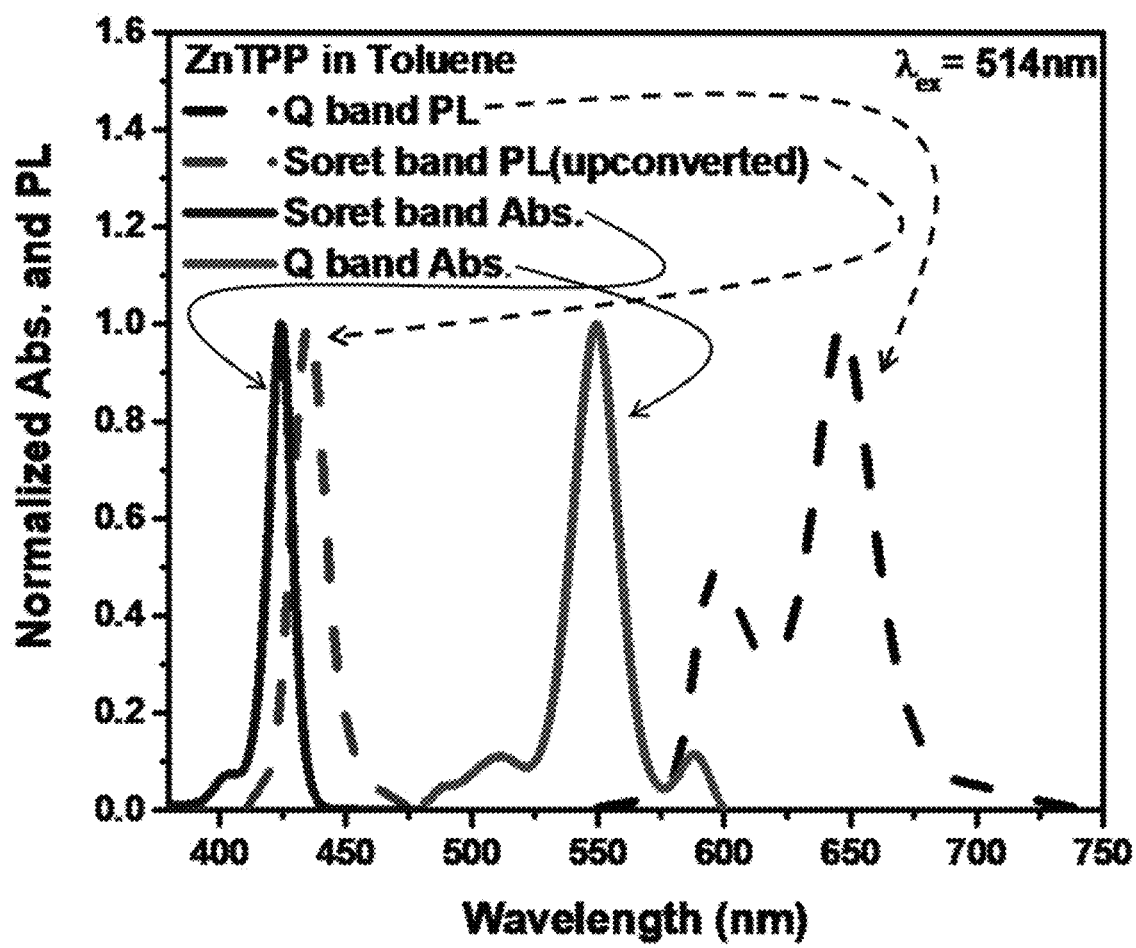
FIG. 21 shows the normalized absorbance and photoluminescence of ZnTPP in toluene.
Figure 22:
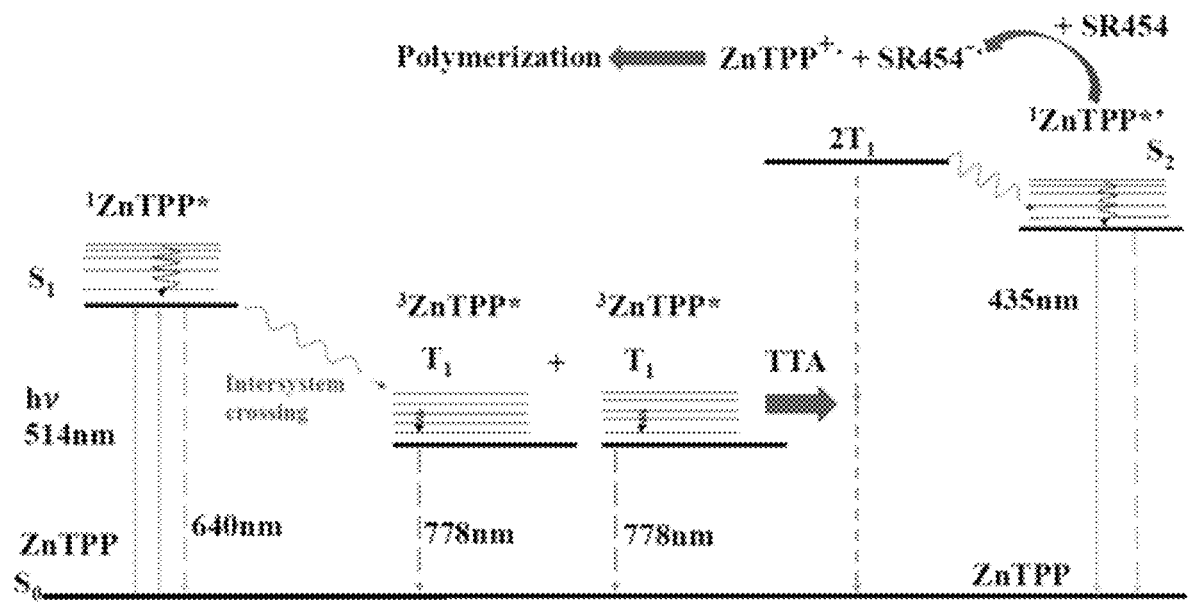
FIG. 22 is a schematic diagram of homomolecular triplet-triplet annihilation for ZnTPP.
Figure 23:
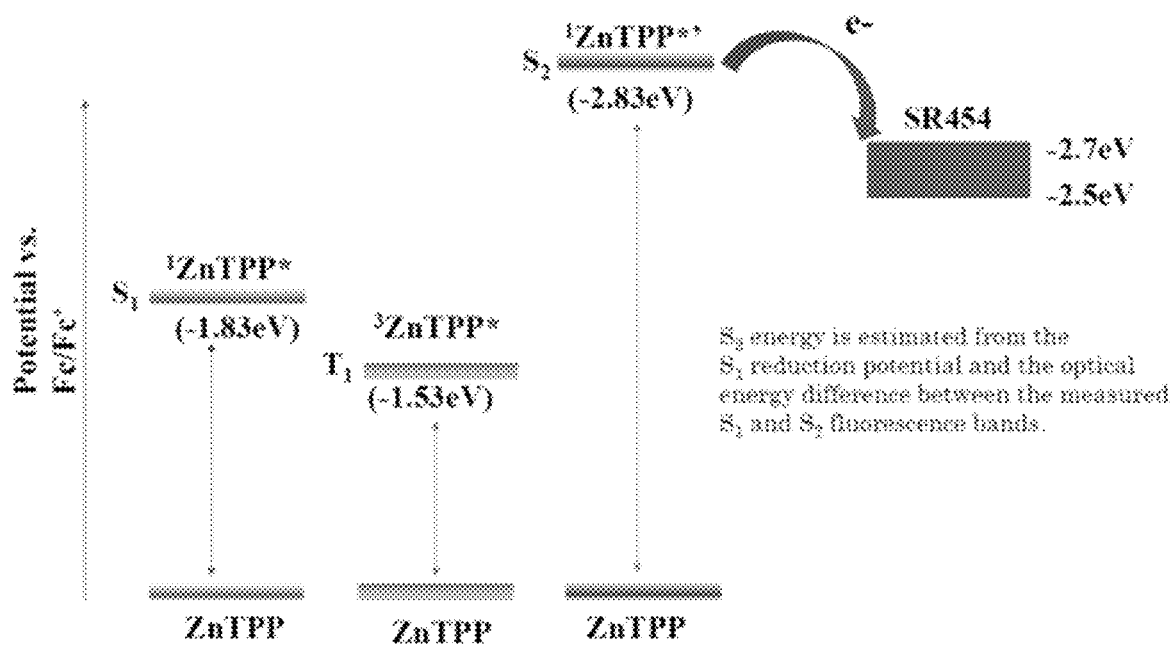
FIG. 23 is a schematic diagram of the excited state redox potentials of ZnTPP relative to SR454.
Figures 24, 25:
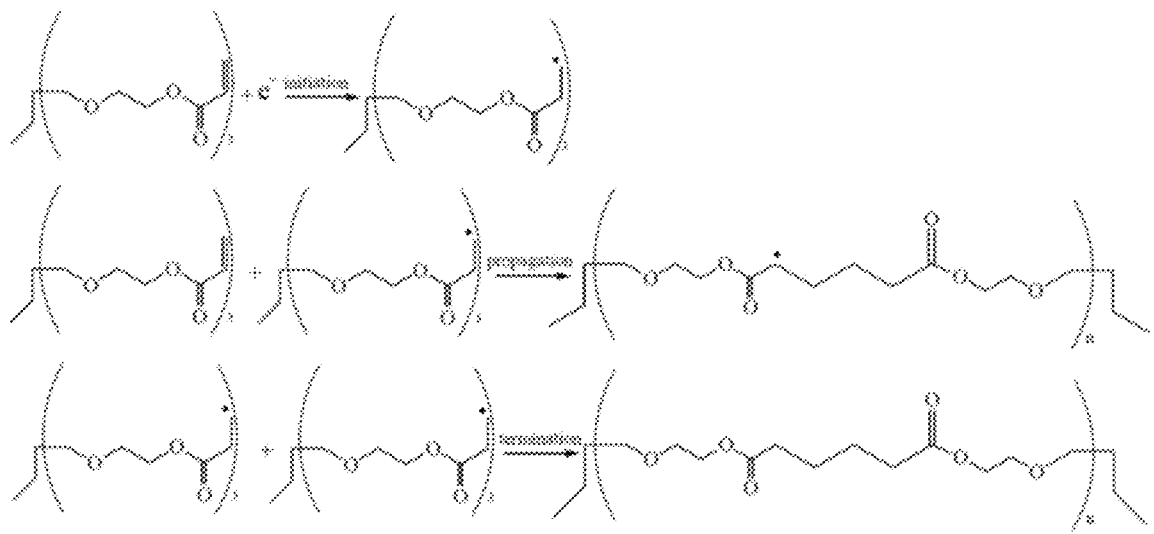
FIG. 24 is a schematic diagram of an example polymerization mechanism for SR454.
FIG. 25 shows the delayed fluorescence (luminescence) from the $S_2$ states of ZnTPP generated through triplet-triplet annihilation.

Homomolecular triplet-triplet annihilation uses a single species as both sensitizer and emitter. This species requires: a high oscillator strength, efficient intersystem crossing to a long-lived triple state, and a fluorescent $S_2$ singlet state with an energy that is slightly less than double the triplet energy. Zinc tetraphenylporphyrin (ZnTPP) (FIG. 20) possesses these features (FIG. 21) and thus is a suitable candidate for homomolecular TTA studies (Yu et al. *J Phys Chem A*, 2002, 106, 9845-9854). A schematic diagram of homomolecular triplet-triplet annihilation for ZnTPP is shown in FIG. 22. A schematic diagram of the excited state redox potentials of ZnTPP relative to SR454 is shown in FIG. 23, where the $S_2$ energy of ZnTPP is estimated from the $S_1$ reduction potential and the optical energy different between the measured $S_1$ and $S_2$ fluorescence bands (Martir et al. *Dalton transactions*, 2017, 46, 2255-2262; Cardona et al. *Advanced Materials*, 2011, 23(20), 2367-2371). FIG. 24 is a schematic diagram of an example polymerization mechanism for SR454. Delayed fluorescence (luminescence) from the $S_2$ states of ZnTPP is generated through triplet-triplet annihilation (FIG. 25) (Stel'makh et al. *Opt. Spektrosk*, 1980, 49, 511-516). Emission occurs from states with very short lifetime ($<10^{-12}$ sec) and low quantum yield ($<10^{-3}$). Accordingly, a powerful excitation source, sensitive recording system, purified substances, and reduced influence of scattering and reabsorption are needed. The ground-state absorption and static fluorescence spectra of ZnTPP in toluene are described, for example, by Yu et al. (*J Phys Chem A*, 2002, 106, 9845-9854).

Figure 26:
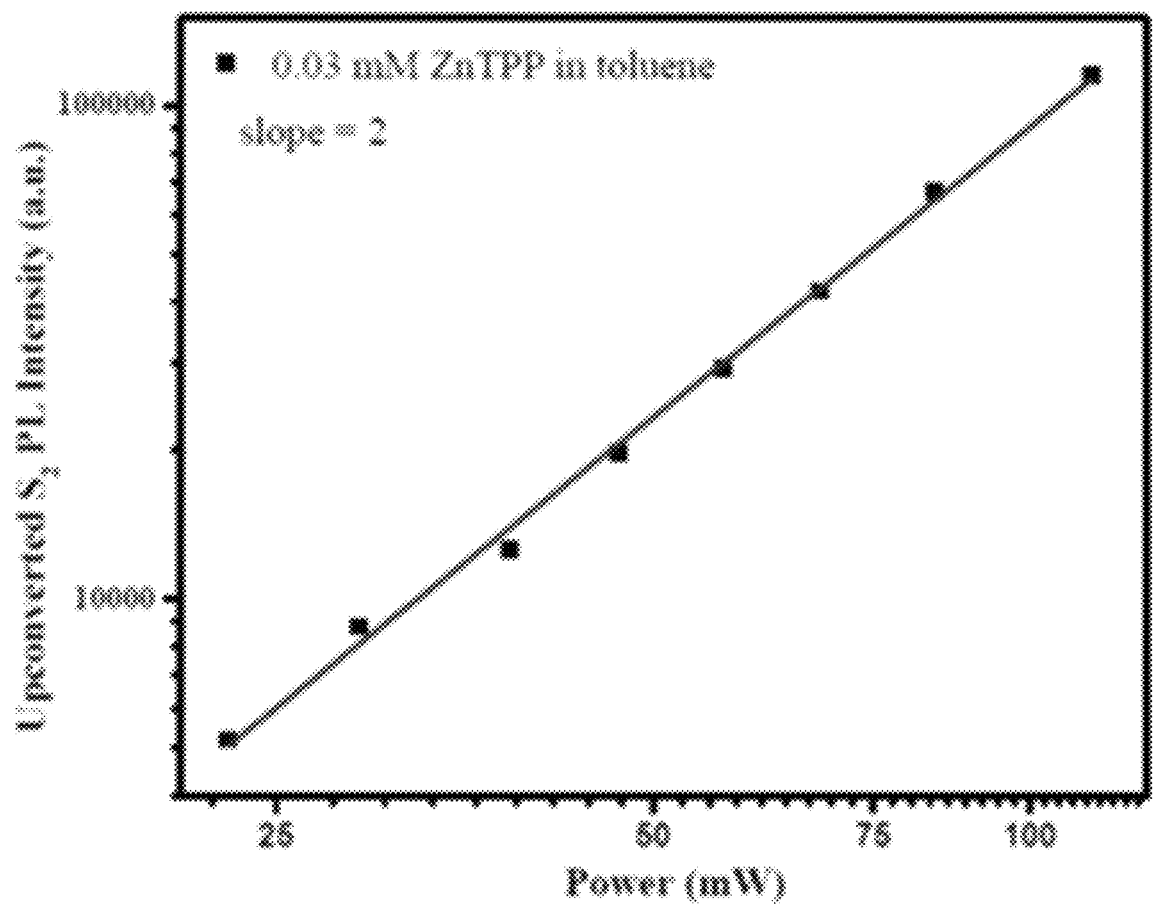
FIG. 26 shows a double logarithmic plot of the upconversion emission signal at 435 nm measured as a function of 514.5 nm (Ar$^+$ laser) incident laser power in a solution of ZnTPP in degassed toluene.
Figure 27:
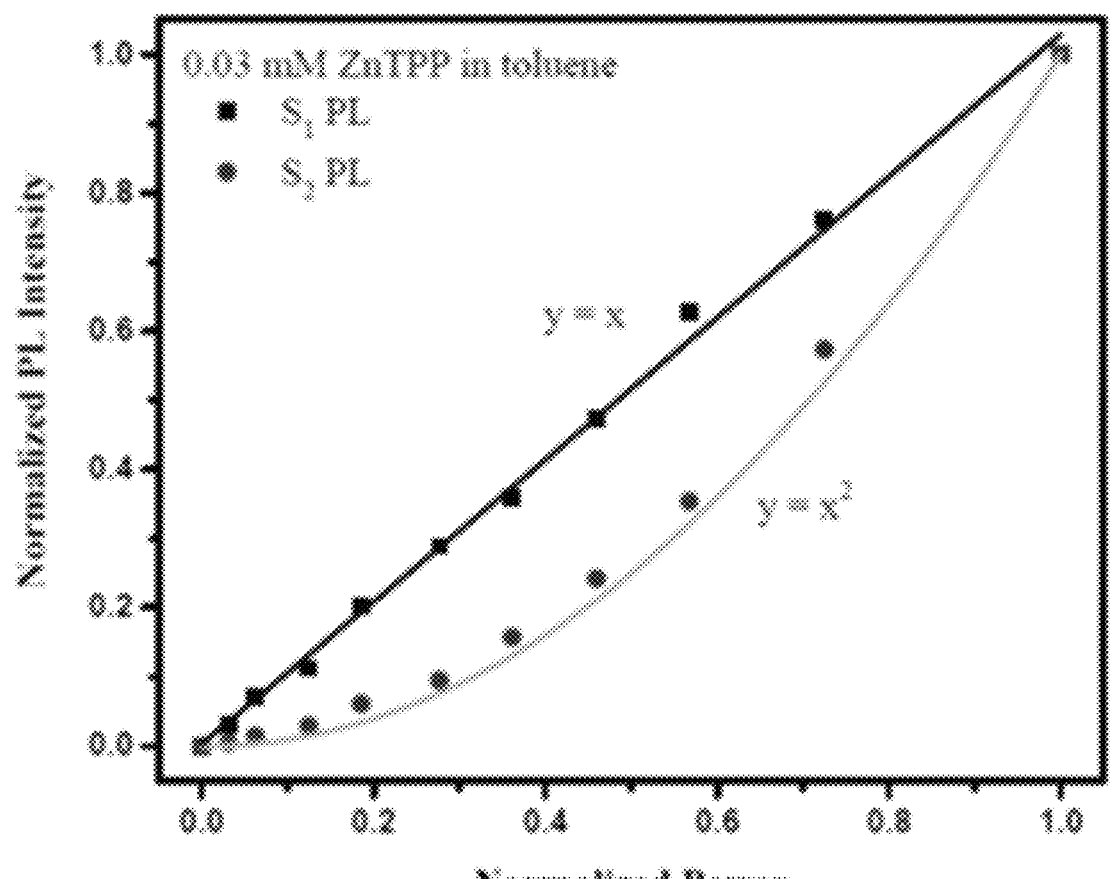
FIG. 27 shows the normalized $S_1$ and $S_2$ emission intensity measured as a function of 514.5 nm (Ar$^+$ laser) incident laser power in a solution of ZnTPP in degassed toluene.

The intensities of the upconverted fluorescence $(S_2)(1)$ and the red fluorescence $(S_1)(2)$ depend on the excitation power density for ZnTPP in Toluene (Stel'makh et al. *Opt. Spektrosk*, 1980, 49, 511-516). The intensity $I_{S1}$ is linearly dependent on the excitation intensity, $I_{excit}$. At low power densities of excitation, when the concentration $[T_1]$ is low and $k_T[T_1] < k_{TT}[T_1]^2$, the dependence of the intensity $I_{S2}$ on $I_{excit}$ is quadratic; at high power densities of excitation when the concentration $[T_1]$ is high and the term $k_{TT}[T_1]^2$ becomes appreciable, the dependence of $I_{S2}$ on $I_{excit}$ is linear (Haefele et al. *J Phys Chem Lett*. 2012, 3, 299-303). A double logarithmic plot of the upconversion emission signal at 435 nm measured as a function of 514.5 nm ($Ar^+$ laser) incident laser power in a solution of ZnTPP in degassed toluene is shown in FIG. 26. The normalized $S_1$ and $S_2$ emission intensity measured as a function of 514.5 nm ($Ar^+$ laser) incident laser power in a solution of ZnTPP in degassed toluene is shown in FIG. 27.

Figure 28:
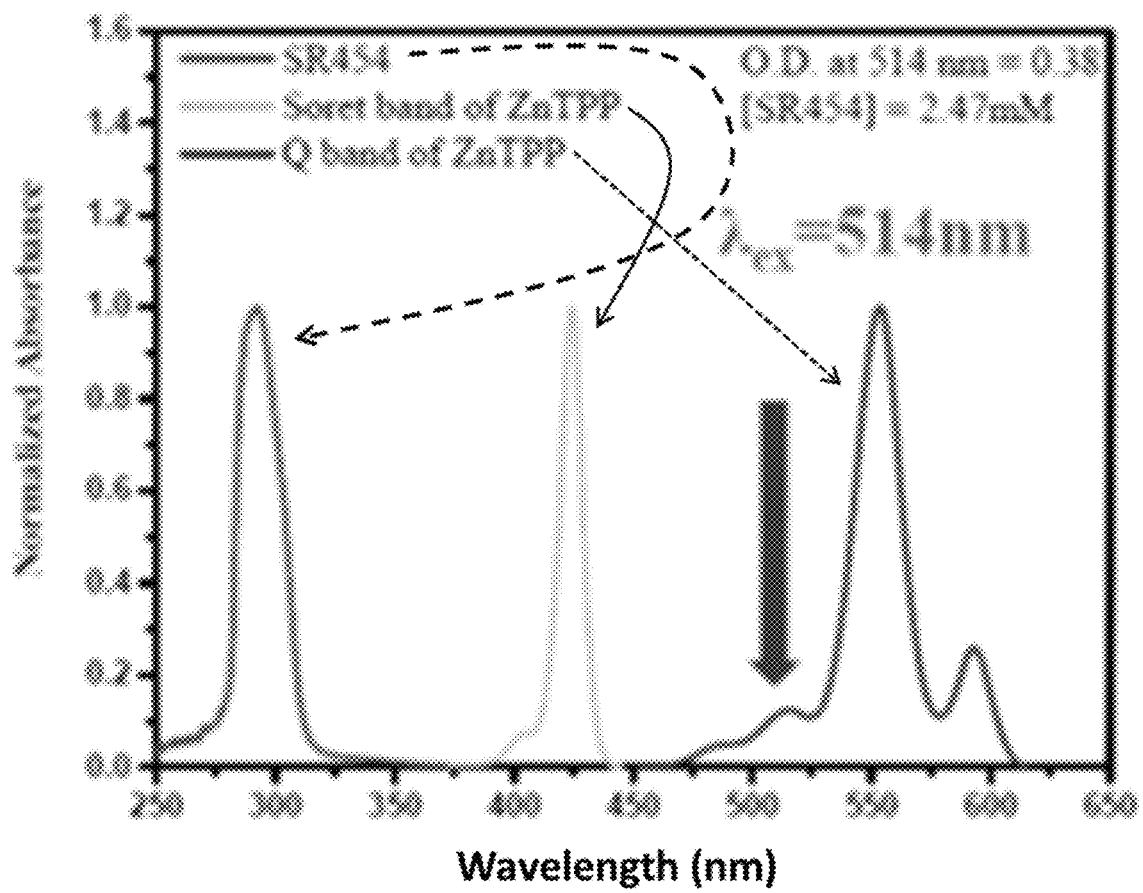
FIG. 28 shows the normalized absorbance spectra of relevant states of SR454 and ZnTPP for a proof-of-concept experiment using 514 nm laser excitation.
Figure 29:
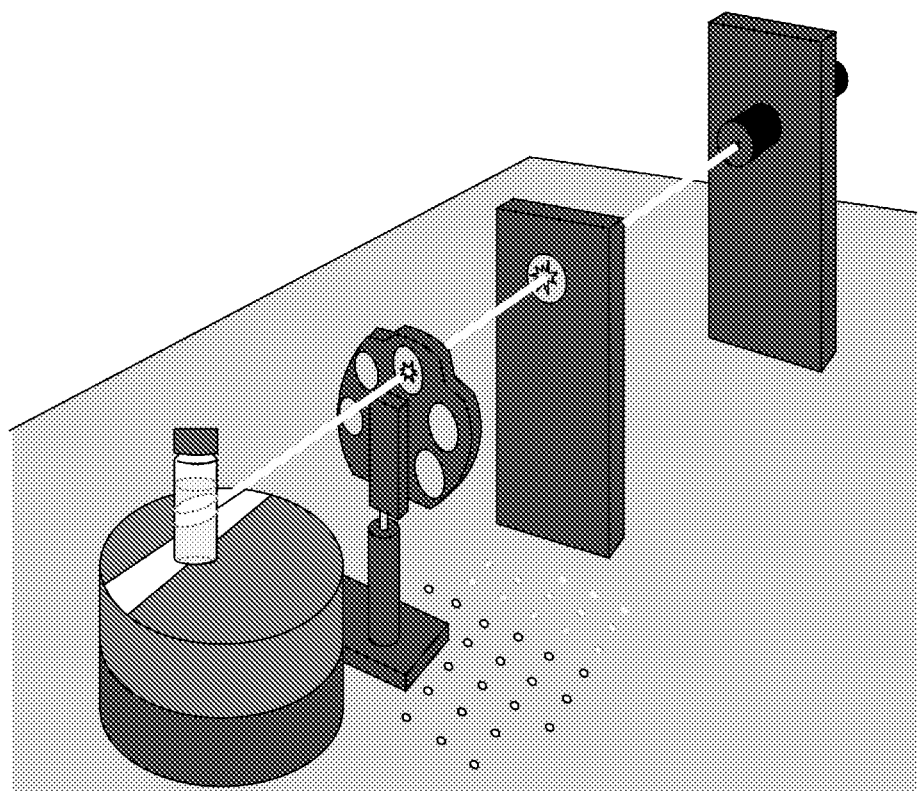
FIG. 29 shows a photograph of the proof-of-concept experiment which resulted in polymerization.
Figure 30:
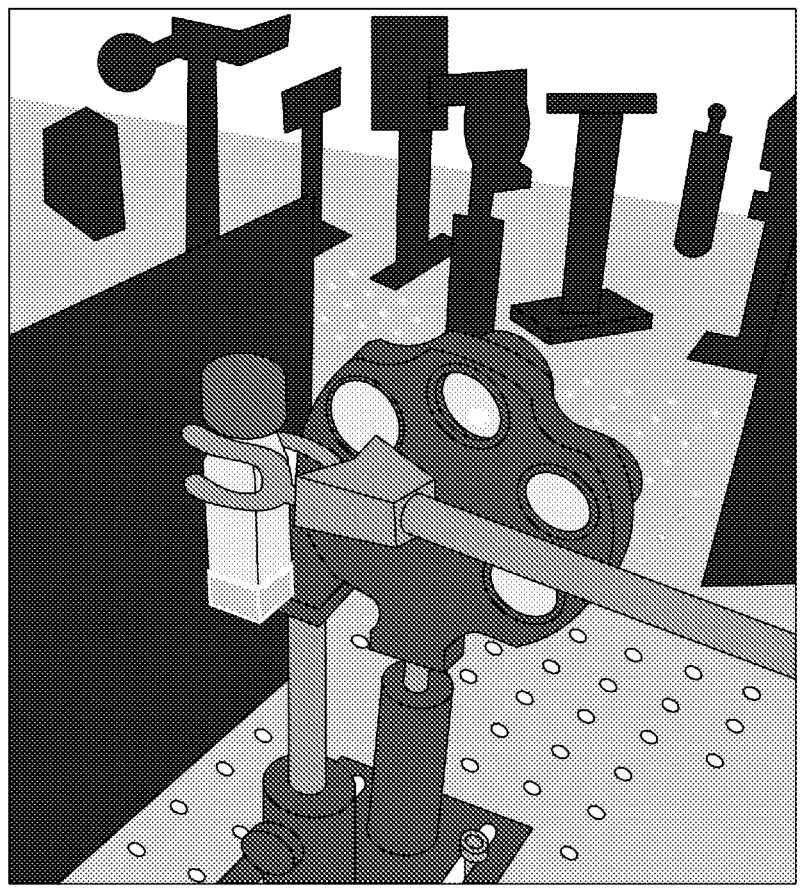
FIG. 30 shows a photograph of the proof-of-concept experiment which resulted in polymerization.
Figure 31:
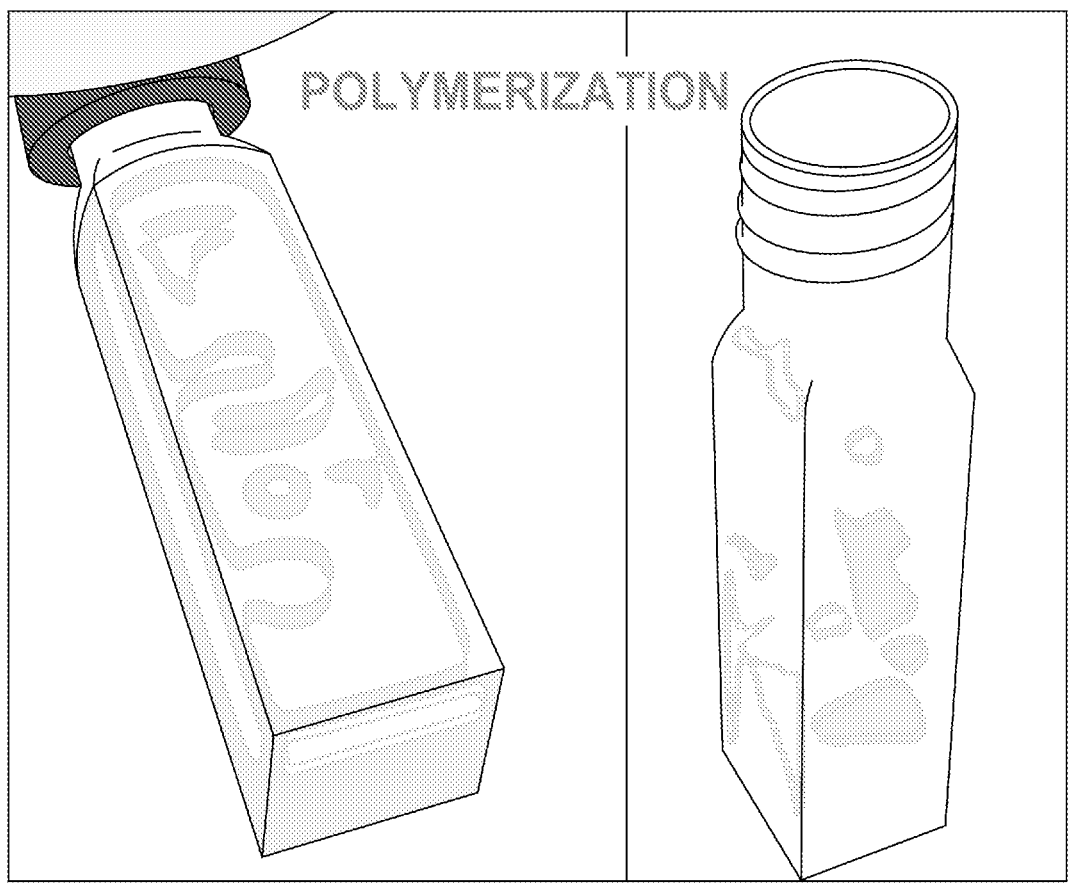
FIG. 31 shows a photograph of the proof-of-concept experiment which resulted in polymerization.

A proof-of-concept experiment using 514 nm laser excitation to excite ZnTPP to polymerize SR454 was performed. The normalized absorbance spectra of relevant states of SR454 and ZnTPP are shown in FIG. 28. FIG. 29-FIG. 31 shows photographs of the proof-of-concept experiment which resulted in polymerization.

Figure 32:
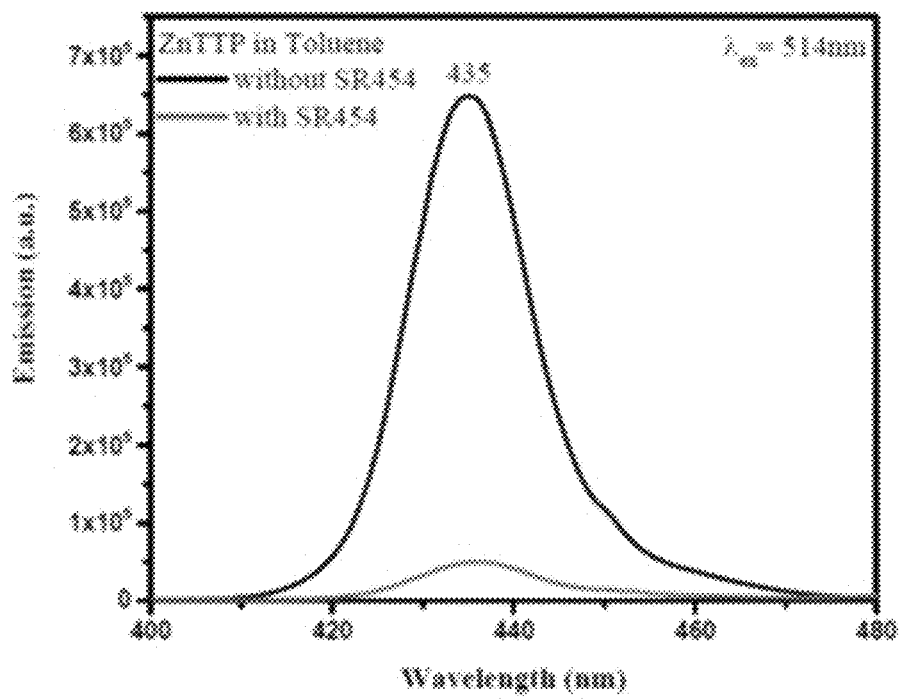
FIG. 32 shows the emission profile of upconverted $S_2$ fluorescence of ZnTPP in degassed toluene with and without SR454 measured as a function of 514.5 nm incident laser power density ($Ar^+$ laser).
Figure 33:
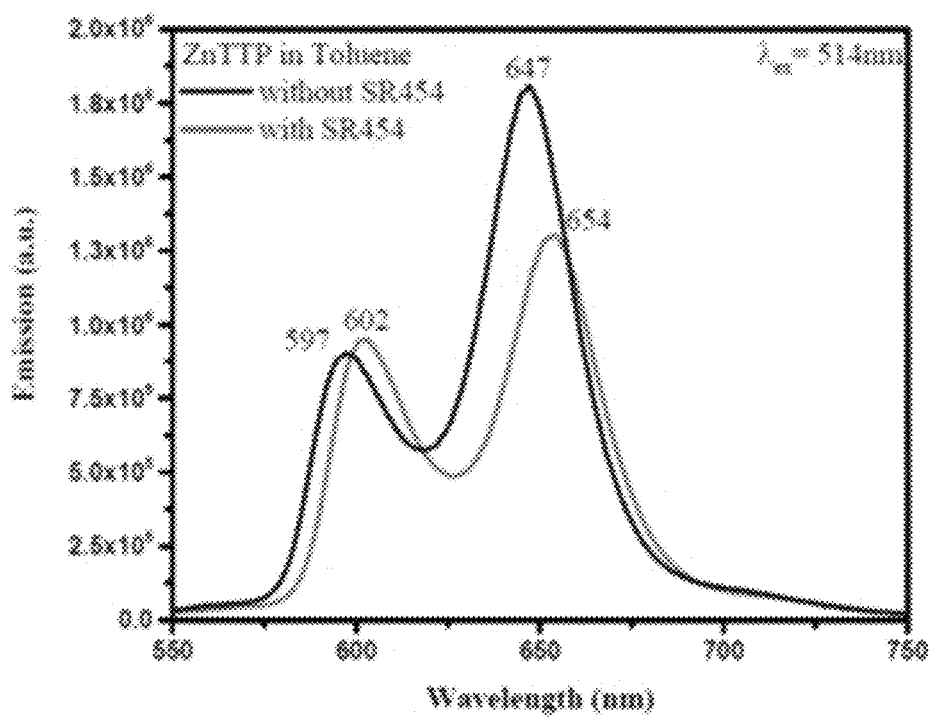
FIG. 33 shows the emission profile of $S_1$ fluorescence of ZnTPP in degassed toluene with and without SR454 measured as a function of 514.5 nm incident laser power density ($Ar^+$ laser).

The effect of SR454 on the $S_1$ and $S_2$ emission o ZnTPP in toluene was also investigated. The emission profile of upconverted $S_2$ fluorescence of ZnTPP in degassed toluene with and without SR454 measured as a function of 514.5 nm incident laser power density ($Ar^+$ laser) is shown in FIG. 32. The emission profile of $S_1$ fluorescence of ZnTPP in degassed toluene with and without SR454 measured as a function of 514.5 nm incident laser power density ($Ar^+$ laser) is shown in FIG. 33.

Figure 34:
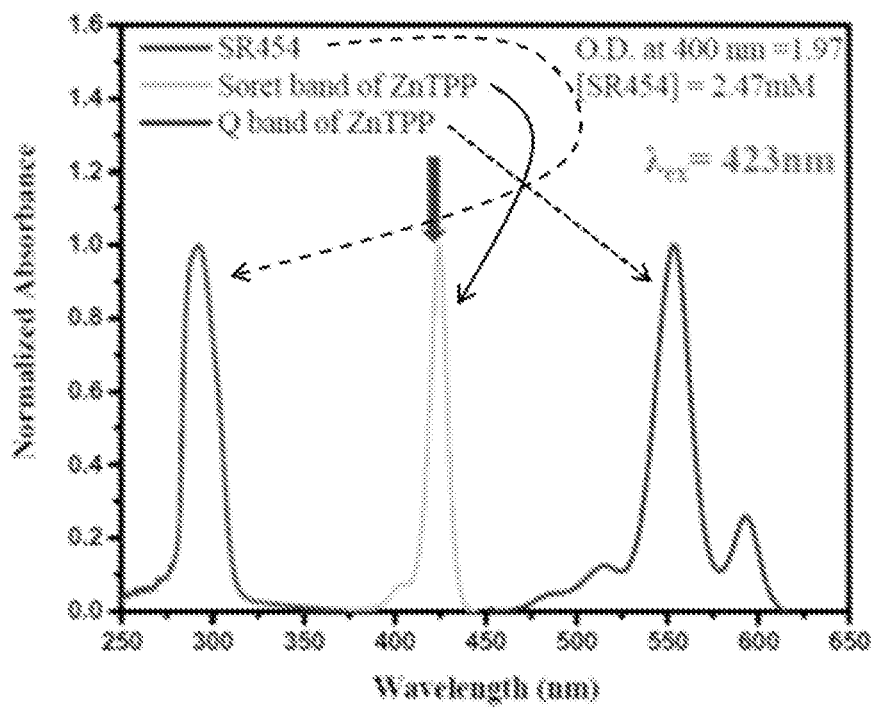
FIG. 34 shows the normalized absorbance spectra of relevant states of SR454 and ZnTPP for a proof-of-concept experiment using 423 nm laser excitation.
Figure 35:
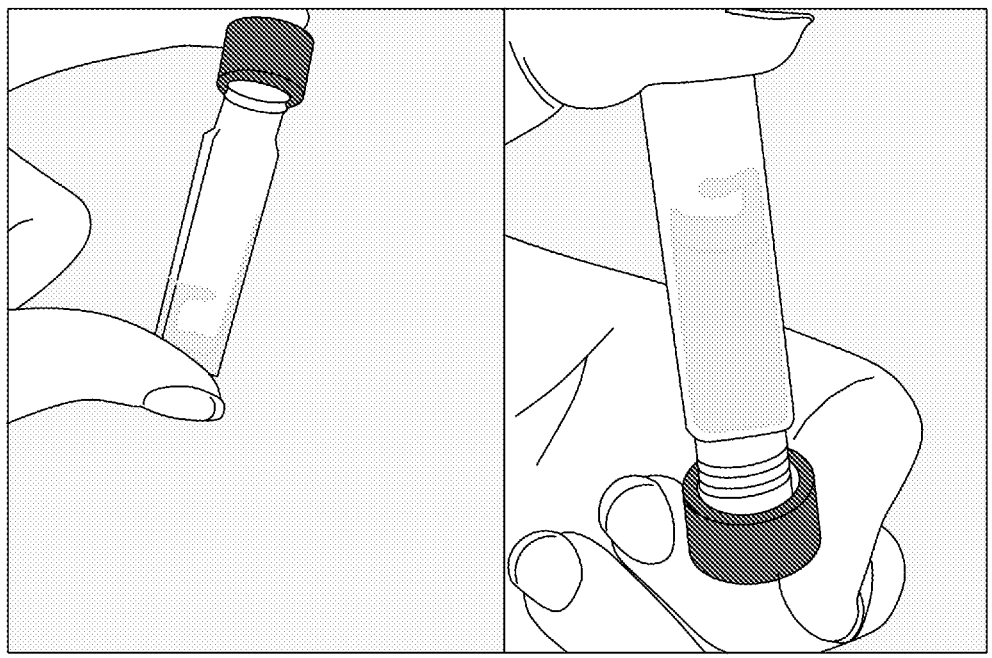
FIG. 35 shows a photograph of the polymerization resulting from the proof-of-concept experiment using 423 nm laser excitation.

A proof-of-concept experiment using 423 nm laser excitation to excite the Soret band of ZnTPP to polymerize SR454 was performed. The normalized absorbance spectra of relevant states of SR454 and ZnTPP are shown in FIG. 34. FIG. 35 shows photographs of polymerization resulting from the proof-of-concept experiment.

Based on these results, the methods described herein can be used to induce polymerization. The methods described herein can reduce the cost and power needs for such polymerizations, as they rely on less expensive and less powerful irradiation sources than traditional methods.

Transient absorption can be used to check for the appearance of electronic absorption bands due to the radical cation of ZnTPP. $S_2$ fluorescence lifetime shortening can be due to quenching by excited state electron transfer. Other metalated porphyrins resonant with currently available laser wavelengths can be used instead of/in addition to ZnTPP. Methyl acrylate can be used instead of SR454 to evaluate excited state electron transfer. The homo-annihilation process can be quantitatively investigated using transient absorption spectroscopy. Negative control experiments using molecules that absorb at a low energy but still homo-annihilate can be used, in which case polymerization should not occur. The methods described herein can be used to prepare 2D and 3D microstructures using fluorescence microscopy.

Example 5

Hydrogels are gels in which the liquid phase is water. Cross-linking can render these gels insoluble and provide additional mechanical strength. Such gels can swell by imbibing small to large quantities of water or biological fluids keeping their cross-linking points. These gels can be biocompatible and soft, and thus similar to natural living tissue. Hydrogels can be adopted to perform a variety of biocompatible tasks including controlled and targeted solute delivery. Hydrogels are generally synthesized by free radical polymerization with photoinitiation, wherein a mixture of monomers and photoinitiator is exposed to the ultraviolet radiation and the photoinitiator absorbs the radiation to produce an unstable excited species. This excited molecule is capable of transferring energy to the monomer and results in formation of free radical by rearrangement, fragmentation, or energy transfer. The free radical formation is followed by a propagation step of polymerization. Currently, hydrogels are used for manufacturing contact lenses, hygiene products, tissue engineering scaffolds, drug delivery systems, wound dressings, etc.

Described herein are methods of polymerization wherein Zn(II) tetraphenylporphyrin (ZnTPP) molecules initially excited with blue or green light generate a high energy excited state (termed the $S_2$ excited state in ZnTPP) that can initiate polymerization in Hydroxyethyl methacrylate (HEMA) and ethylene glycol dimethacrylate (EGDMA) monomers, resulting in the formation of macroscopic polymer gels constructed within the photolyzed area of the solution. Then, the addition of water to the gel results in the formation of hydrogels. These methods can enable visible-light activation of photo-polymerization processes in water instead of organic solvents, using ZnTPP as a photoinitiator.

Described herein are compositions of matter, for example PHEMA gels synthesized by free radical polymerization of 2-Hydroxyethyl methacrylate (HEMA) and ethylene glycol dimethacrylate (EGDMA) monomers where EGDMA acts as a crosslinker. In the literature, this polymerization process is initiated by ultraviolet light and free-radical initiators such as 2,4,6,-Trimethylbenzoyl-diphenyl-phosphineoxide (Darocur TPO), AIBN, etc. Before starting the polymerization process described herein, nitrogen gas is bubbled through the mixture to remove dissolved oxygen since oxygen can interfere with the polymerization by reacting or forming complexes with the photoinitiator.

The compositions and methods described herein can comprise a polymerizable composition integrating photochemical upconversion, comprising a polymerization initiator and a polymerizable resin, wherein said initiator is capable of both undergoing a homomolecular triplet-triplet annihilation process and generating a radical, and said resin contains a solvent (e.g., water) and two monomer structures. The upconverting polymerization initiator can be a metalloporphyrin complex, and the resin monomeric components can comprise at least one acrylate end group. The composition is oxygen-depleted by inert gas bubble degassing, freeze-pump-thaw method, or addition of an oxygen scavenger, as oxygen can interfere with the polymerization by reacting or forming complexes with the photoinitiator.

In the literature, synthesis of hydrogels by free radical polymerization requires the input of either high-energy ultraviolet (UV) light or requires sophisticated molecules designed to absorb UV light. On the other hand, the compositions and methods described herein comprise a formulation including a porphyrin (ZnTPP), which absorbs light in the visible range, and two monomers, wherein polymerization was induced by irradiation with visible light. These methods for photochemical-induced polymerization utilizes low power visible light excitation instead of high energy UV light to form hydrogels, which are three-dimensional structures that exhibit the ability to swell in water and keep significant amount of water within the structures. For example, the composition of matter can comprise ZnTPP and 2-Hydroxyethyl methacrylate (HEMA) and ethylene glycol dimethacrylate (EGDMA) monomers, where EGDMA acts as a crosslinker.

As a control experiment, solutions containing only the 2-Hydroxyethyl methacrylate (HEMA) and ethylene glycol dimethacrylate (EGDMA) monomers were degassed and excited with green (525 nm) and blue (450 nm) LED for 24 hours, and polymerization was not observed. This suggests that the presence of ZnTPP is essential to induce the polymerization at these wavelengths in these compositions.

As another control experiment, the effect of different excitations of ZnTPP on the polymerization was investigated. Direct excitation into the Soret band of ZnTPP using 425 nm (blue LED) results in a fast polymerization (24 hours) and complete polymerization that forms a very viscous gel. Meanwhile, Q-band excitation of ZnTPP forms a viscous gel after more than 24 hours (slower polymerization) and an incomplete polymerization (not all the solution becomes viscous).

The hydrogels described herein can be characterized by Fourier transform infrared (FTIR) spectroscopy. Further, the surface morphology of the hydrogels can be studied using Atomic force microscopy (AFM) and others (DSC, TGA, etc.). In some examples, the concentrations of the initiator, the concentration of the monomers, the identity of the monomers, can be selected in view of a variety of factors, such as the desired time to polymerize the composition using the methods described and/or the desired level of polymerization of the composition achieved using the methods described herein.

The polymerization process described herein comprises irradiating a polymerizable composition at 425 nm (blue light emitting diode LED) or 525 nm (green LED), which are longer wavelengths (e.g., lower energy) than the absorption band of the monomers that normally causes polymerization using a single-molecule linear process, and causing a polymerization reaction using a bimolecular upconversion process. The methods described herein for creating hydrogels comprise: dissolving the upconverting initiator into the monomers, and applying an irradiation technique to excite the low-energy absorption band of the initiator. Using a metalloporphyrin such as ZnTPP, this corresponds to an excitation into the Q or Soret band of the oxygen-free polymerizable composition with an argon, He/Ne laser or visible-light excitation lamps or diodes.

The composition of polyacrylates and their derivatives can be changed to influence the permeability and diffusion patterns of hydrogels. Accordingly, it is possible to synthesize hydrogels that can be used to immobilize a great variety of compounds, including drugs, proteins, and even cells. In this way, different systems with different applications can be obtained using the methods and compositions described herein. The controlled delivery of therapeutic agents with acrylate polymers has become a popular method of drug administration in recent years. In particular, microneedle arrays (MN) can be prepared from hydrogel-forming materials. Such microneedle arrays cam swell in skin to produce continuous, unblockable conduits from patch-type drug reservoirs to the dermal microcirculation, thus allowing prolonged transdermal drug administration Currently, hydrogels are used for manufacturing contact lenses, hygiene products, tissue engineering scaffolds, drug delivery systems, wound dressings, etc. A common type of hydrogel used in contact lenses and tissue engineering is PHEMA gel. P-HEMA hydrogels are among the most widely studied of all the synthetic hydrogel materials.

Also, these highly hydrophilic polymers (hydrogels) can be used in sanitary products, such as diapers, materials for wound closure, intraocular and contact lenses, soil improvement, vegetal growth, etc.

Example 6

Photochemical upconversion induced polymerization methods are described herein.

The compositions and methods described herein comprise a formulation including a porphyrin (ZnTPP), which absorbs light in the visible range, and two monomers, wherein polymerization was induced by irradiation with visible light. These methods for photochemical-induced polymerization utilizes low power visible light excitation instead of high energy UV light to form hydrogels, which are three-dimensional structures that exhibit the ability to swell in water and keep significant amount of water within the structures. For example, the composition of matter can comprise ZnTPP and 2-Hydroxyethyl methacrylate (HEMA) and ethylene glycol dimethacrylate (EGDMA) monomers, where EGDMA acts as a crosslinker.

The metalloporphyrin ZnTPP was purchased from Frontier Scientific and used as received. Absorption and fluorescence emission spectra of ZnTPP in dilute toluene solution showed that there were no fluorescent impurities present in the samples. Spectroscopic samples for TTA experiments were prepared using spectroscopic grade toluene (99.7% purity) purchased from Alfa Aesar and were deoxygenated with appropriate degassing with argon prior to all measurements unless otherwise indicated. For polymerization experiments, trimethylolpropane triacrylate and methyl acrylate (both from Alfa Aesar) were used as received.

Absorption spectra were measured using an Agilent 8453 diode array spectrometer. Steady-state photoluminescence spectra were recorded using a FL/FS920 spectrometer from Edinburgh Instruments. Excitation was achieved by the 514.5 nm line from an Ar$^+$ laser (Coherent Innova 70C) isolated with a narrow laserline bandpass filter or a 450 W Xenon arc lamp equipped with a monochromator and appropriate long pass filters. The incident laser or lamp excitation power was varied using a series of neutral density filters placed directly in front of the sample. All luminescence samples were prepared in a 1 cm$^2$ optical cells and were subjected to degassing with argon gas for at least 30 min prior to all measurements. The laser and lamp excitation powers were measured using either a Molectron Power Max 5200 power meter or an Ophir Nova II/PD300-UV power meter, respectively. Nanosecond transient absorption measurements were performed with a LP 920 spectrometer from Edinburgh Instruments. Excitation of the samples in these experiments was accomplished using a Nd:YAG/OPO laser system from Opotek (Vibrant LD 355 II) operating at 1 Hz.

Figure 36:
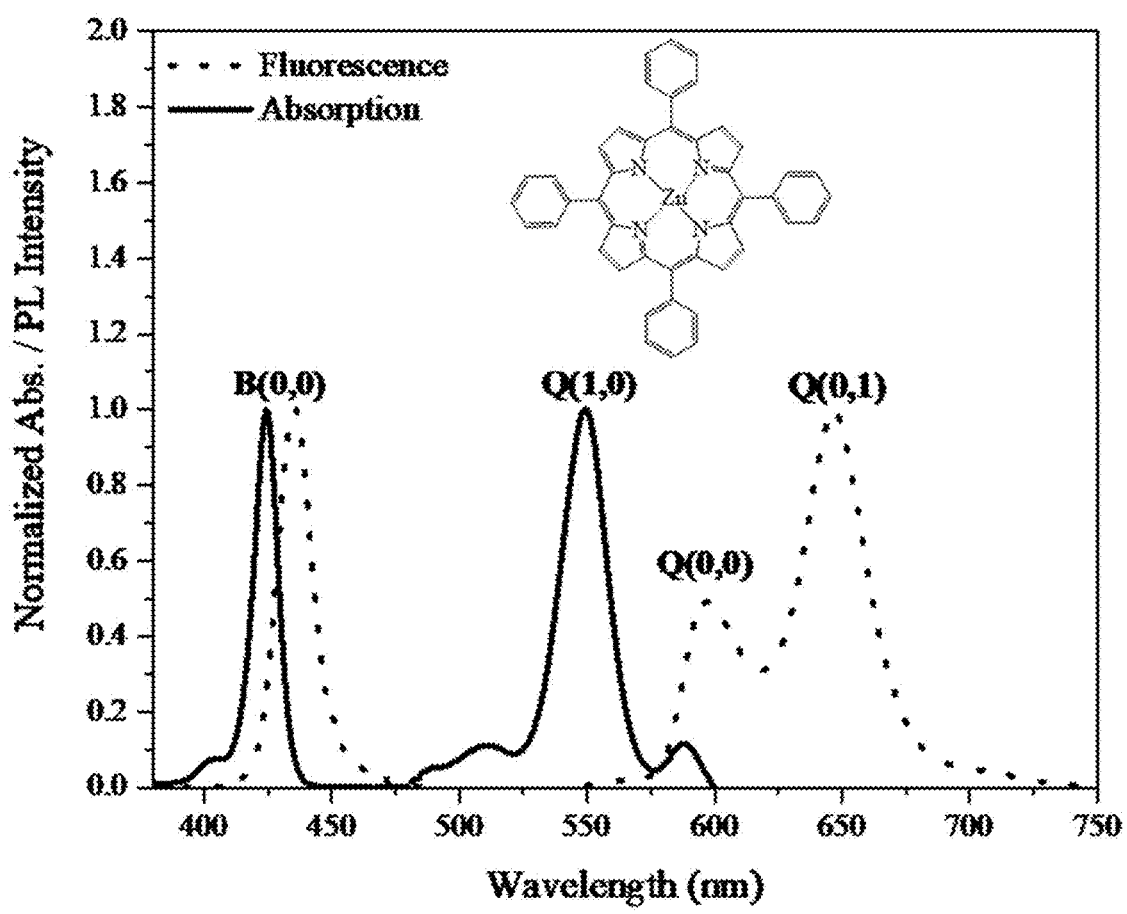
FIG. 36 shows the normalized ground-state absorption and static fluorescence spectra of ZnTPP in degassed toluene, with the excitation wavelength at 514.5 nm and $c=1.8 \times 10^{-5}$ M.

FIG. 36 shows the normalized ground-state absorption and static fluorescence spectra of ZnTPP in degassed toluene, with the excitation wavelength at 514.5 nm and c=1.8×$10^{-5}$ M.

Figure 37:
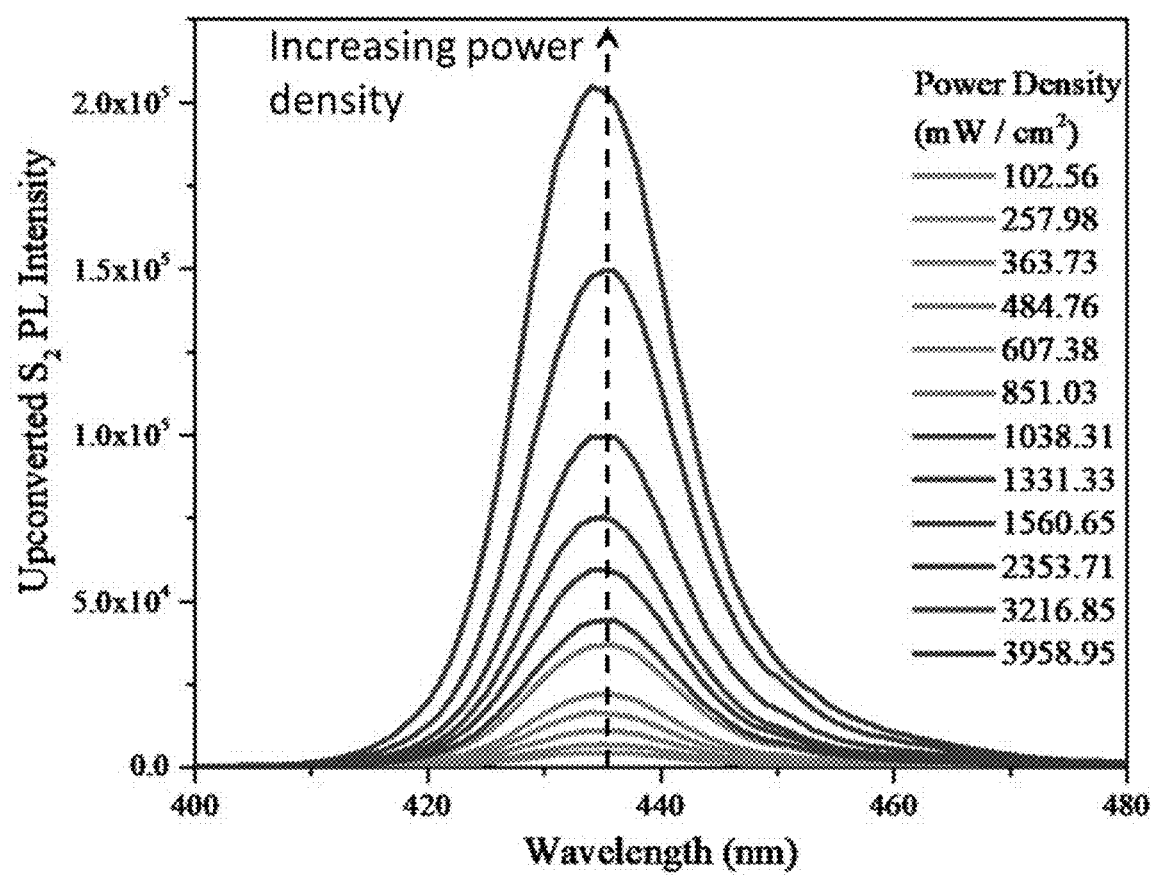
FIG. 37 shows the upconverted $S_2$ photoluminescence intensity profile of a degassed solution of $1.8 \times 10^{-5}$ M ZnTPP measured as a function of 514.5 nm incident laser power density.

FIG. 37 shows the upconverted $S_2$ photoluminescence intensity profile of a degassed solution of $1.8\times10^{-5}$ M ZnTPP measured as a function of 514.5 nm incident laser power density.

Figure 38:
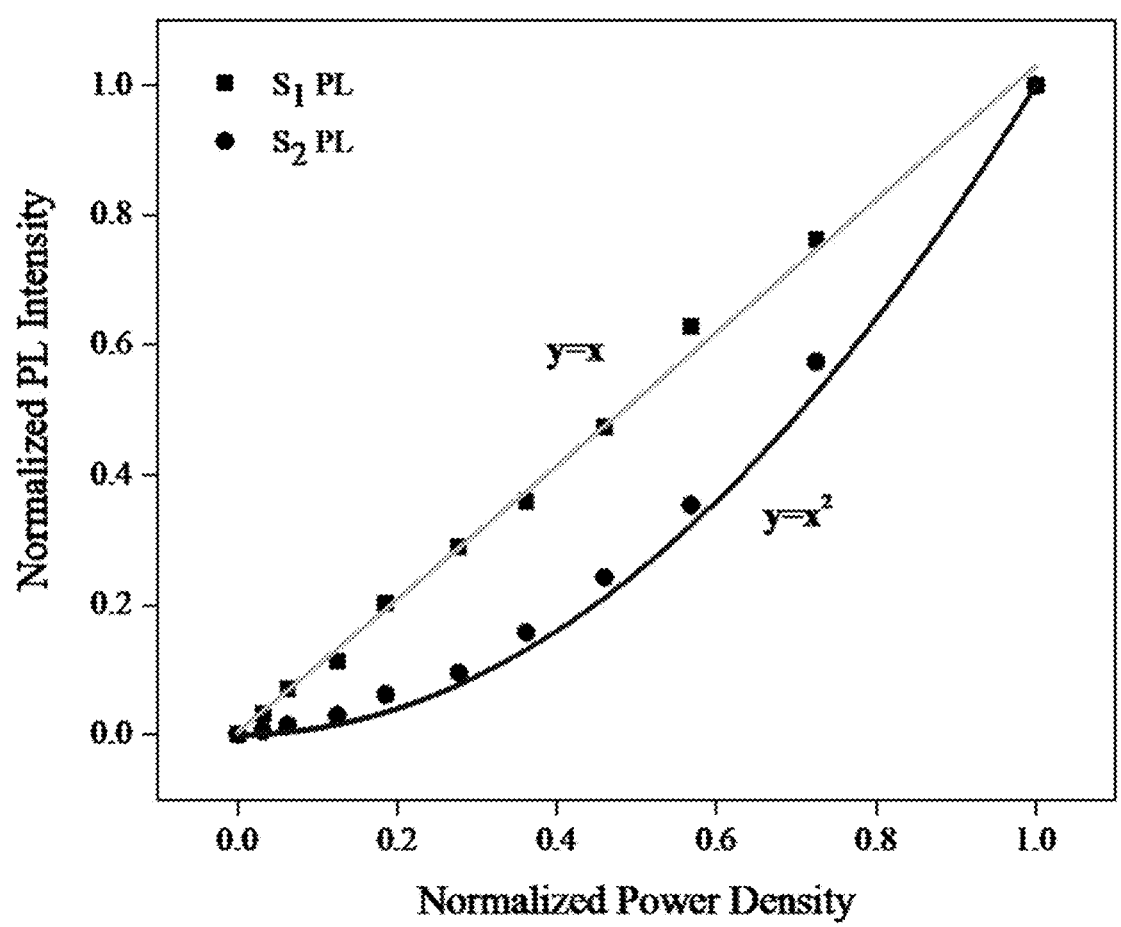
FIG. 38 shows the normalized integrated S1 and S2 emission intensity measured as a function of the normalized incident optical laser power density in a solution of $1.8 \times 10^{-5}$ M ZnTPP in degassed toluene.

FIG. 38 shows the normalized integrated S1 and S2 emission intensity measured as a function of the normalized incident optical laser power density in a solution of 1.8×10–5 M ZnTPP in degassed toluene.

Figure 39:
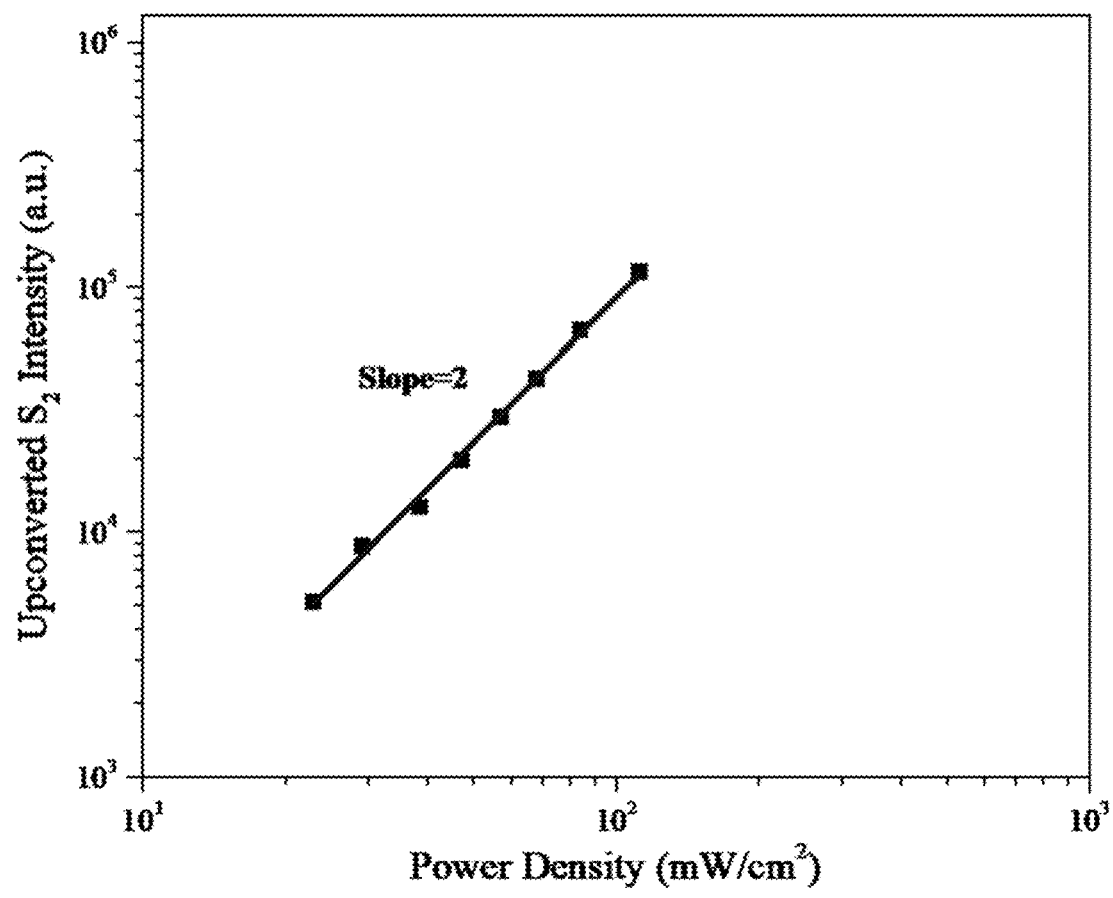
FIG. 39 shows a double logarithmic plot of the upconversion emission signal at 435 nm measured as a function of 514.5 nm incident laser power in a solution of ZnTPP ($1.8 \times 10^{-5}$ M, O.D. @ 514 nm=0.08) in argon-degassed toluene. The line is a linear fit with a slope of 2.0 (quadratic response) in the low power regime.

FIG. 39 shows a double logarithmic plot of the upconversion emission signal at 435 nm measured as a function of 514.5 nm incident laser power in a solution of ZnTPP ($1.8\times10^{-5}$ M, O.D. @ 514 nm=0.08) in argon-degassed toluene. The line is a linear fit with a slope of 2.0 (quadratic response) in the low power regime.

Figure 40:
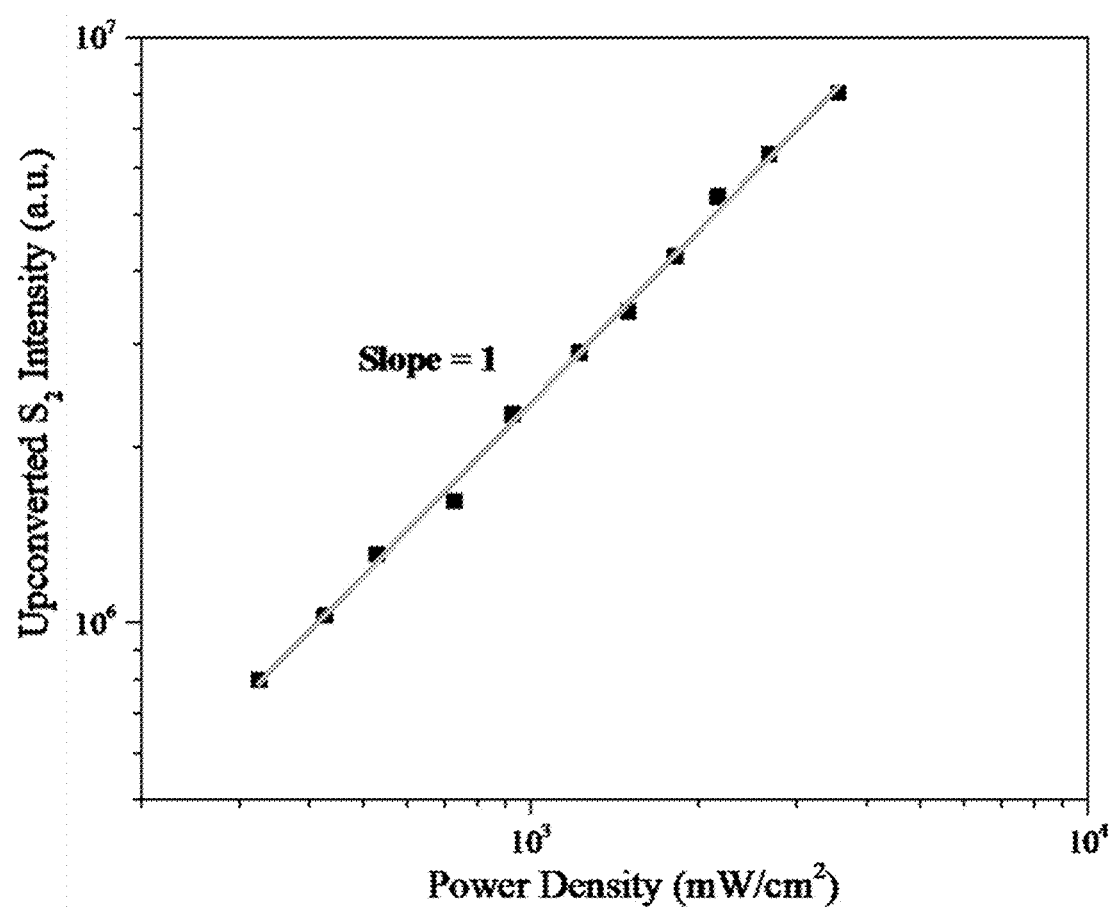
FIG. 40 shows a double logarithmic plots of the upconversion emission signal at 435 nm measured as a function of 514.5 nm incident laser power in a solution of ZnTPP ($1.8 \times 10^{-5}$ M, O.D. @ 514 nm=0.08) in argon-degassed toluene. The line is a linear fit with a slope of 1.0 (linear response) in the high power regime.

FIG. 40 shows a double logarithmic plots of the upconversion emission signal at 435 nm measured as a function of 514.5 nm incident laser power in a solution of ZnTPP ($1.8\times10^{-5}$ M, O.D. @ 514 nm=0.08) in argon-degassed toluene. The line is a linear fit with a slope of 1.0 (linear response) in the high power regime.

Figure 41:
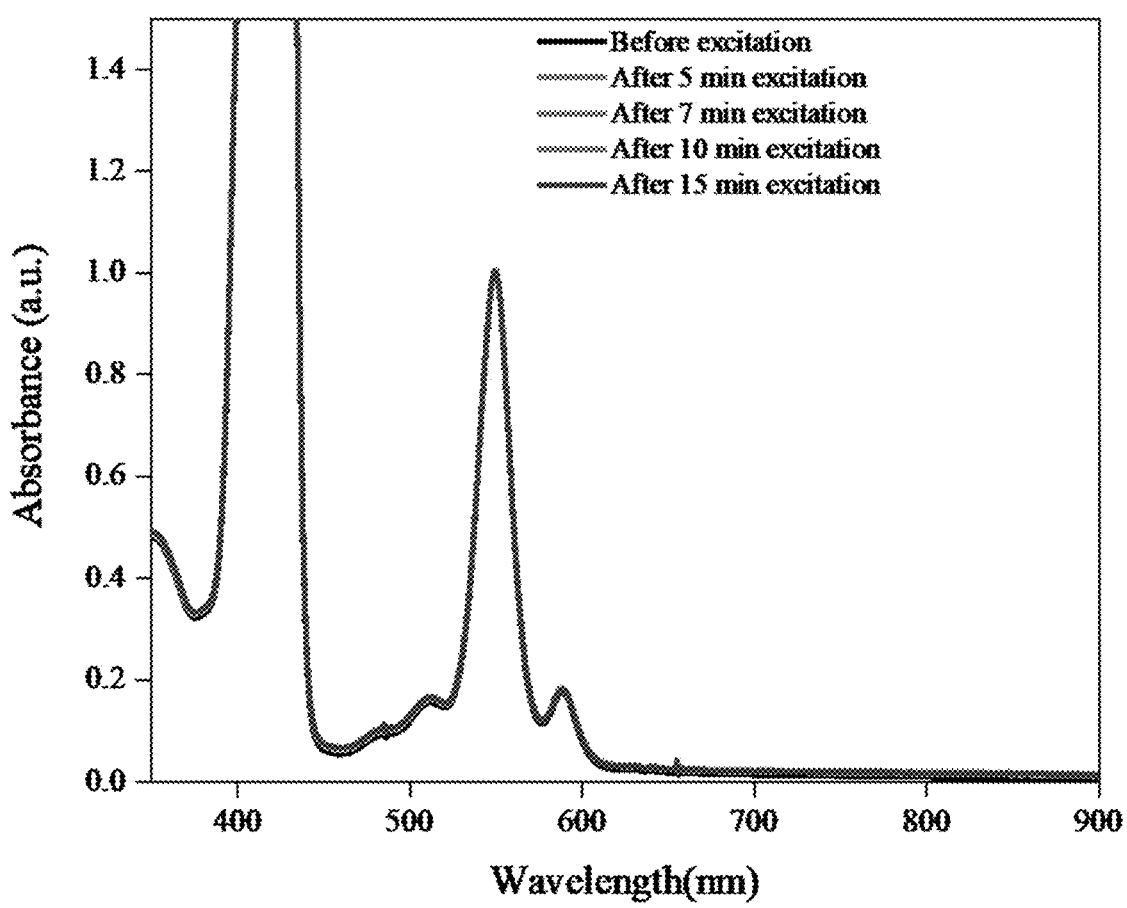
FIG. 41 shows the change of the absorption spectra of $3 \times 10^{-5}$ M ZnTPP in degassed toluene in the absence of MA by irradiation of the laser pointer at 532 nm from before excitation to after 15 minutes of continuous excitation.

FIG. 41 shows the change of the absorption spectra of $3\times10^{-5}$ M ZnTPP in degassed toluene in the absence of MA by irradiation of the laser pointer at 532 nm from before excitation to after 15 minutes of continuous excitation.

Figure 42:
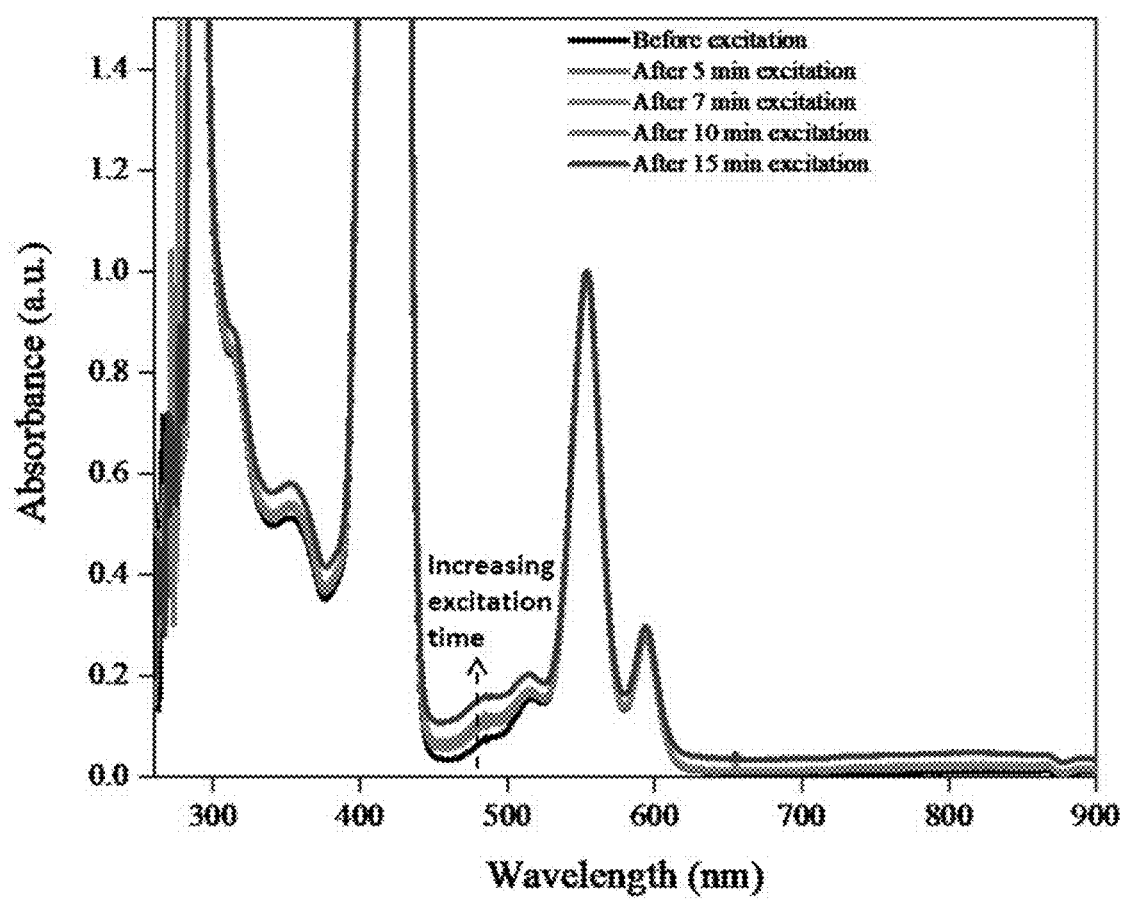
FIG. 42 shows the change of the absorption spectra of $3 \times 10^{-5}$ M ZnTPP in degassed toluene in the presence of 3.7 M MA by irradiation of the laser pointer at 532 nm from before excitation to after 15 minutes of continuous excitation.

FIG. 42 shows the change of the absorption spectra of $3\times10^{-5}$ M ZnTPP in degassed toluene in the presence of 3.7 M MA by irradiation of the laser pointer at 532 nm from before excitation to after 15 minutes of continuous excitation.

Figure 43:
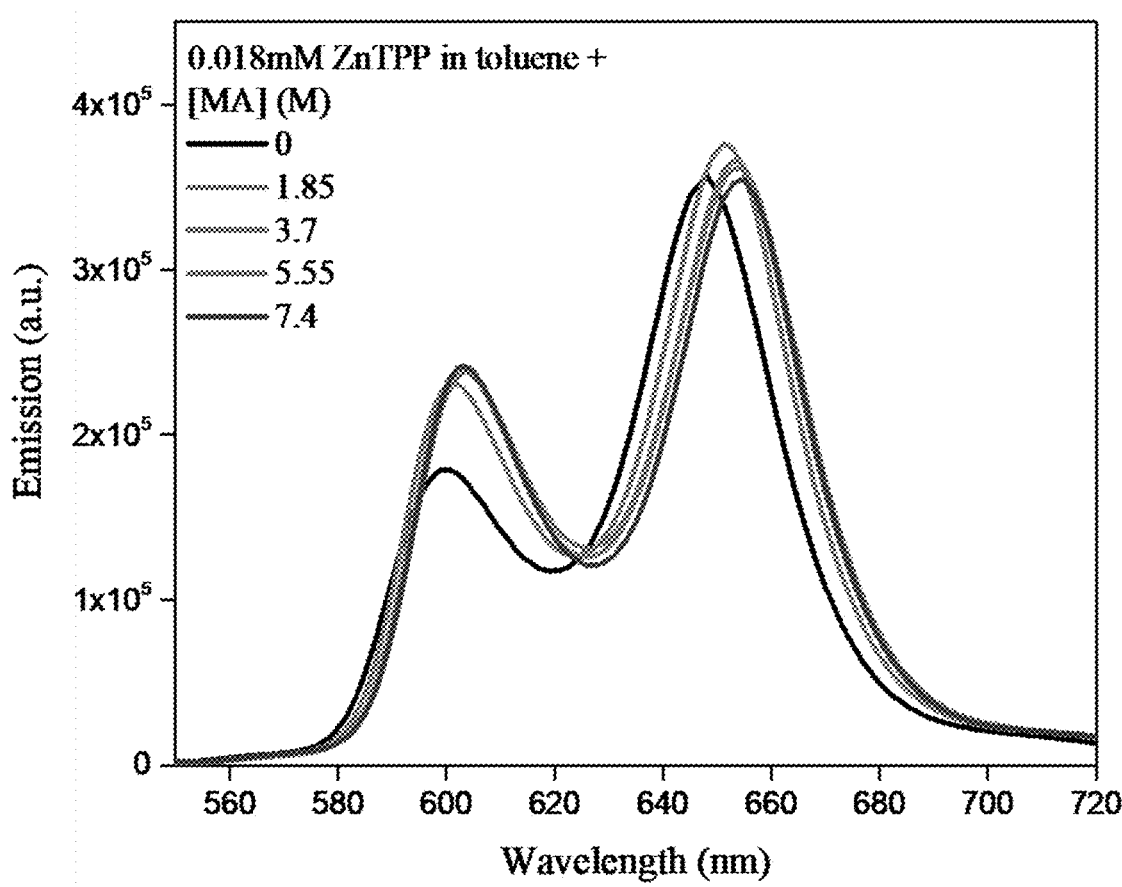
FIG. 43 shows the $S_1$ emission spectra of ZnTPP ($1.8 \times 10^{-5}$ M) as a function of increasing concentrations of MA (0-7.4 M) after 514 nm lamp excitation in degassed toluene.

FIG. 43 shows the $S_1$ emission spectra of ZnTPP ($1.8\times10^{-5}$ M) as a function of increasing concentrations of MA (0-7.4 M) after 514 nm lamp excitation in degassed toluene.

Figure 44:
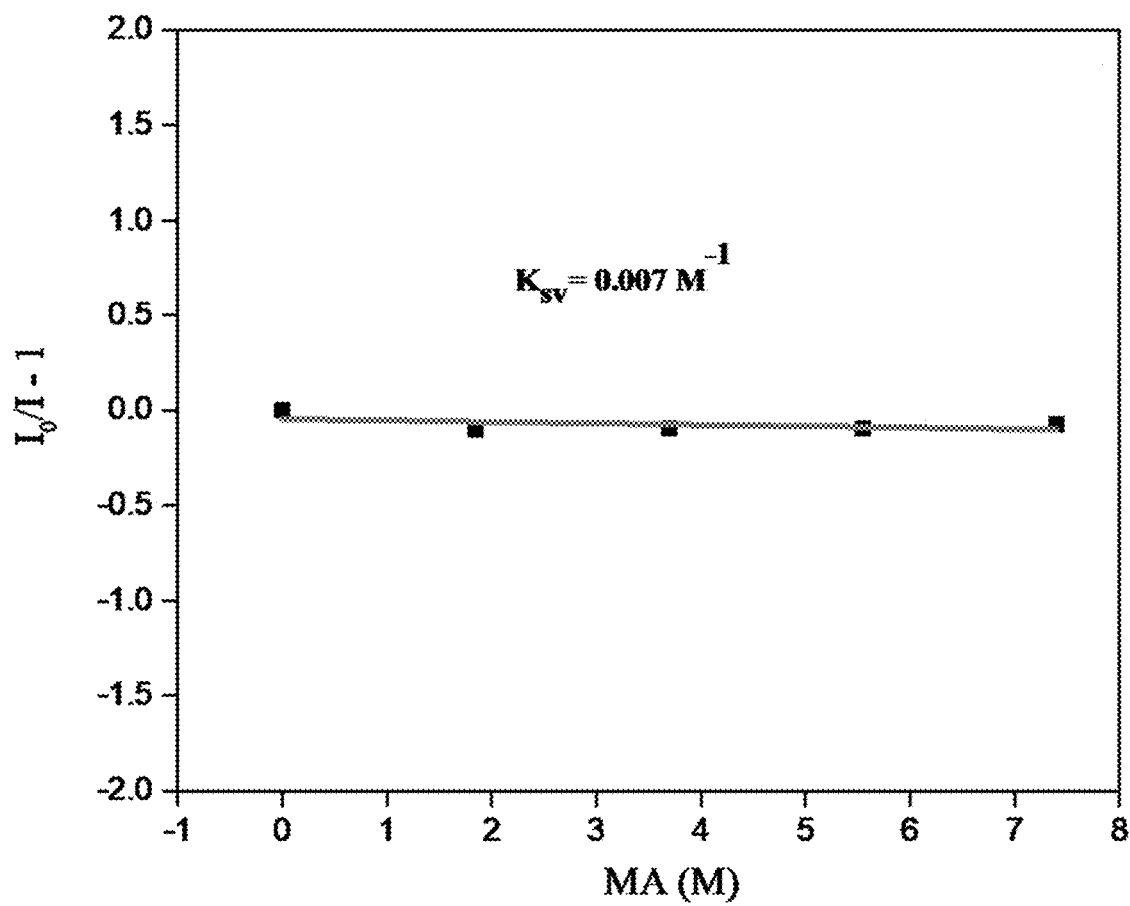
FIG. 44 shows the Stern-Volmer plot generated from $S_1$ emission intensity quenching of ZnTPP by MA using integrated emission from FIG. 43.

FIG. 44 shows the Stern-Volmer plot generated from $S_1$ emission intensity quenching of ZnTPP by MA using integrated emission from FIG. 43.

Figure 45:
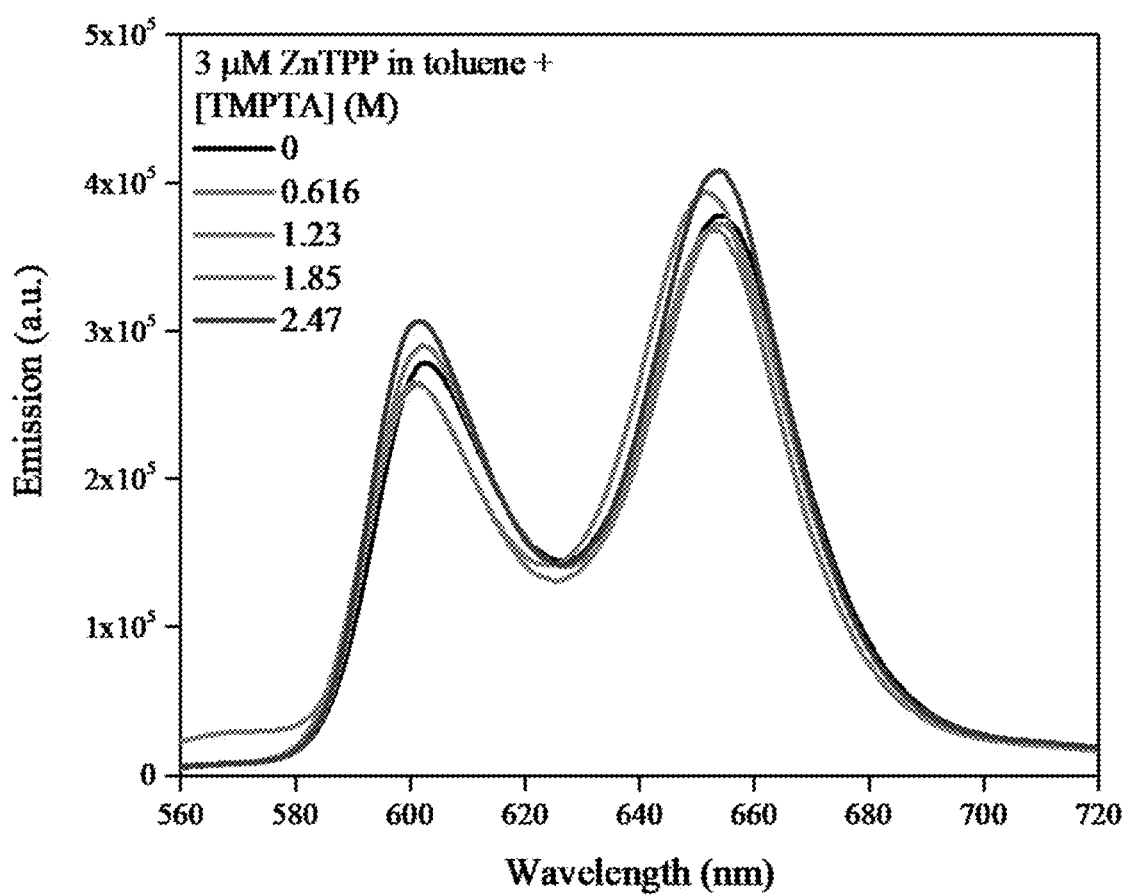
FIG. 45 shows the $S_1$ emission spectra of ZnTPP (3 μM) as a function of increasing concentrations of TMPTA (0-2.47 M) after 550 nm lamp excitation in aerated toluene.

FIG. 45 shows the $S_1$ emission spectra of ZnTPP (3 μM) as a function of increasing concentrations of TMPTA (0-2.47 M) after 550 nm lamp excitation in aerated toluene.

Figure 46:
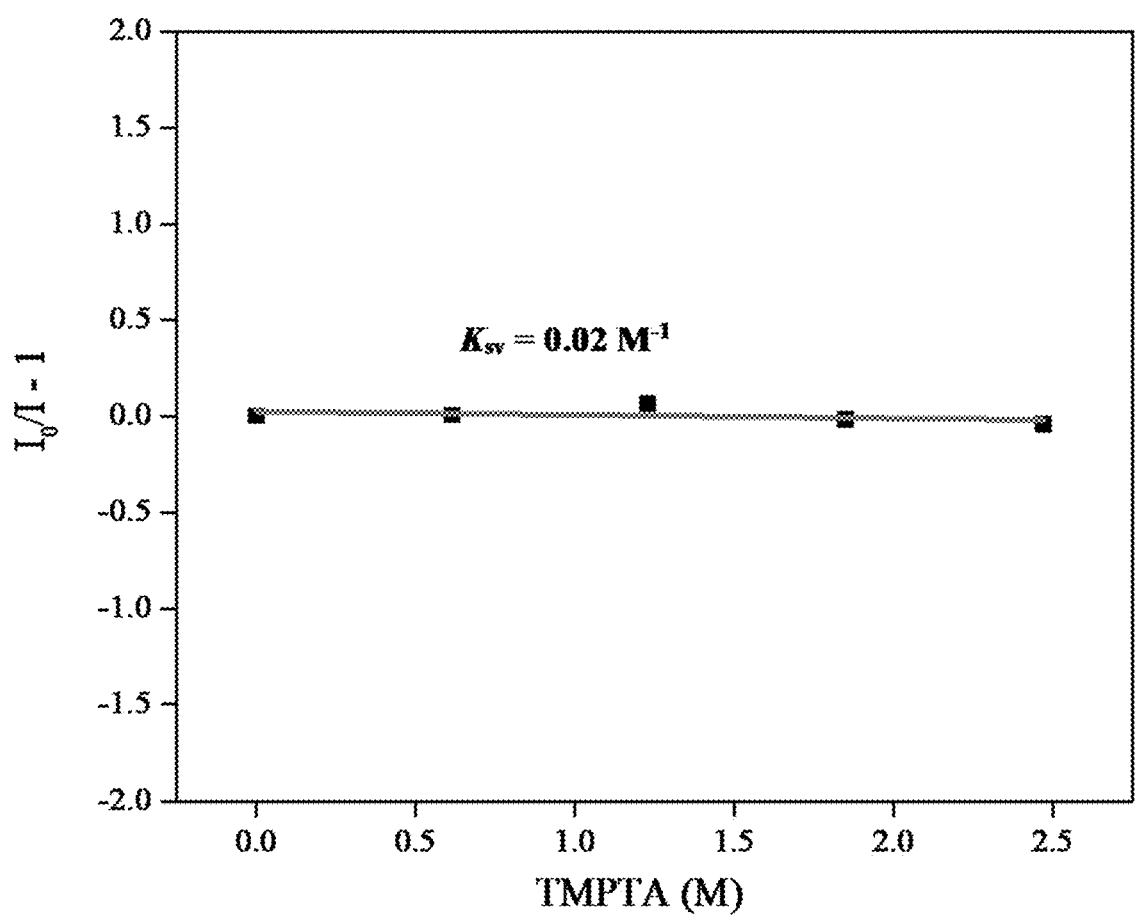
FIG. 46 shows the Stern-Volmer plot generated from $S_1$ emission intensity quenching of ZnTPP by TMPTA using integrated emission from FIG. 45.

FIG. 46 shows the Stern-Volmer plot generated from $S_1$ emission intensity quenching of ZnTPP by TMPTA using integrated emission from FIG. 45.

Figure 47:
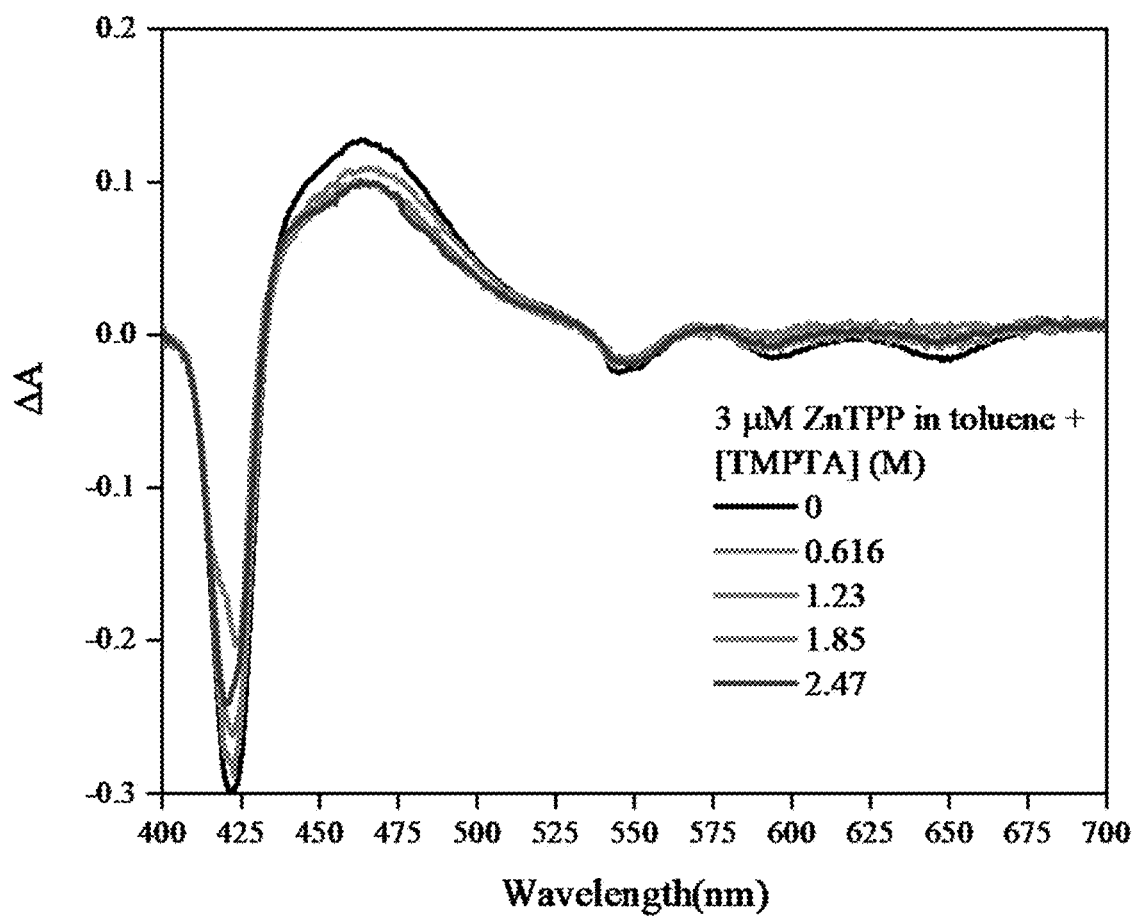
FIG. 47 shows the transient absorption spectra of 3 μM ZnTPP measured as a function of increasing concentrations of TMPTA (0-2.47 M) after 550 nm laser irradiation in aerated toluene.

FIG. 47 shows the transient absorption spectra of 3 μM ZnTPP measured as a function of increasing concentrations of TMPTA (0-2.47 M) after 550 nm laser irradiation in aerated toluene.

Figure 48:
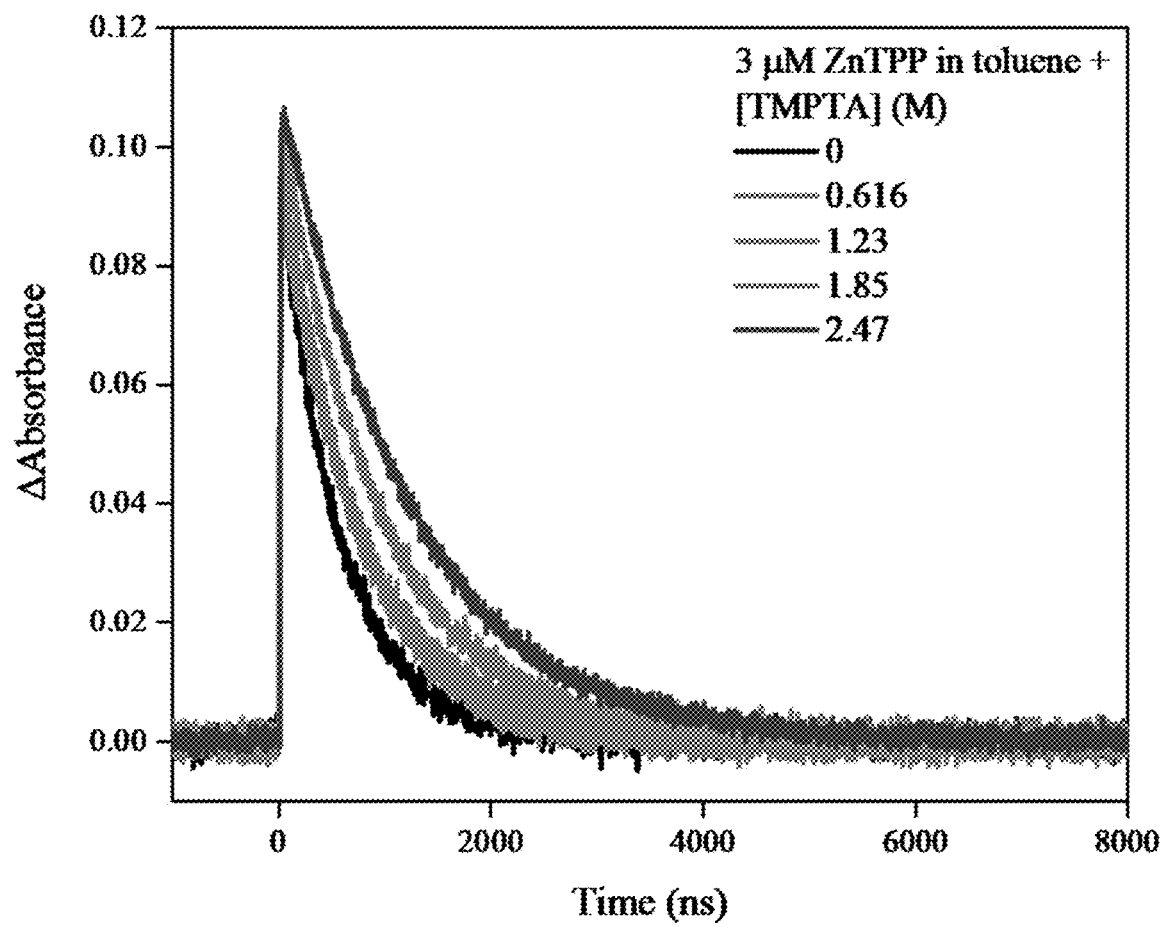
FIG. 48 shows the representative transient absorption kinetic decay of triplet ZnTPP at 460 nm upon 550 nm excitation (3.5 mJ/pulse) measured as a function of increasing TMPTA in aerated toluene.

FIG. 48 shows the representative transient absorption kinetic decay of triplet ZnTPP at 460 nm upon 550 nm excitation (3.5 mJ/pulse) measured as a function of increasing TMPTA in aerated toluene.

Figure 49:
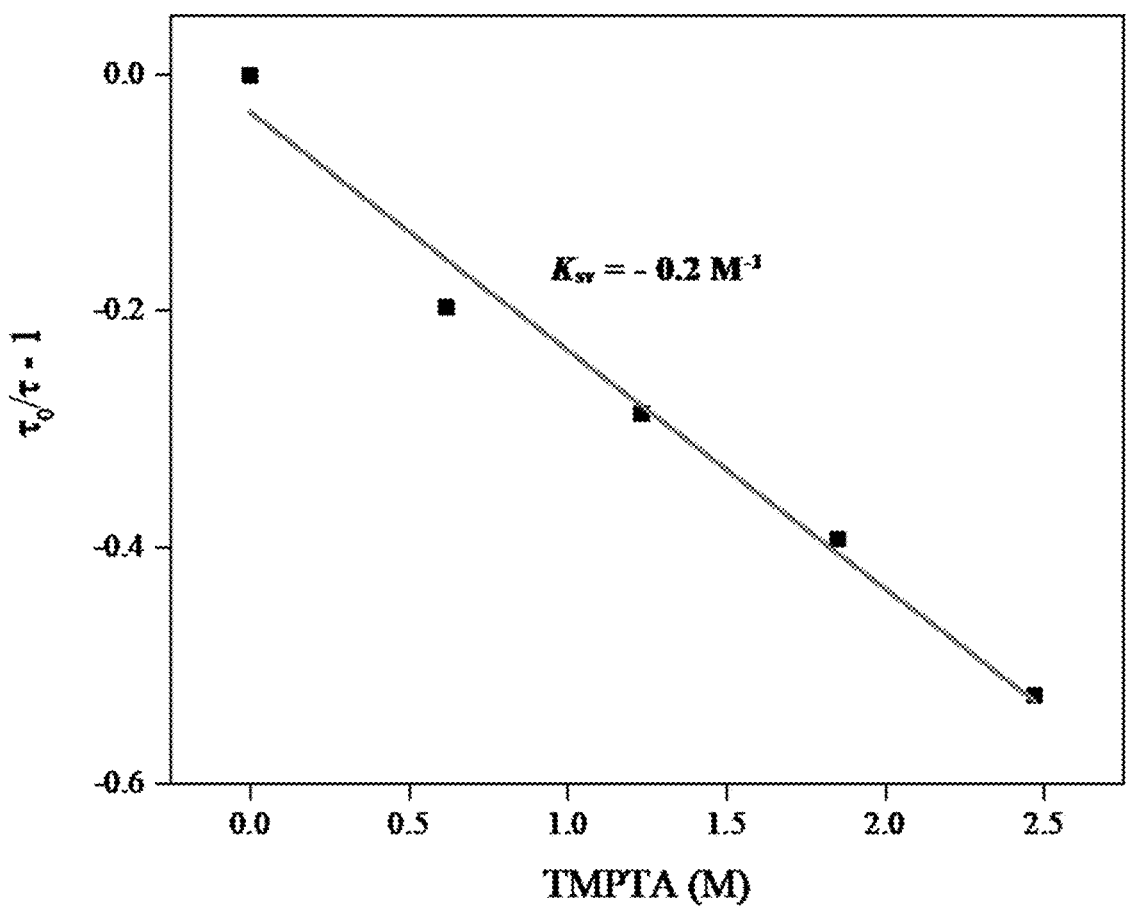
FIG. 49 shows the Stern-Volmer plot generated from excited-state lifetime quenching of ZnTPP by TMPTA at 460 nm using first-order fits to the data from FIG. 48.

FIG. 49 shows the Stern-Volmer plot generated from excited-state lifetime quenching of ZnTPP by TMPTA at 460 nm using first-order fits to the data from FIG. 48.

Figure 50:
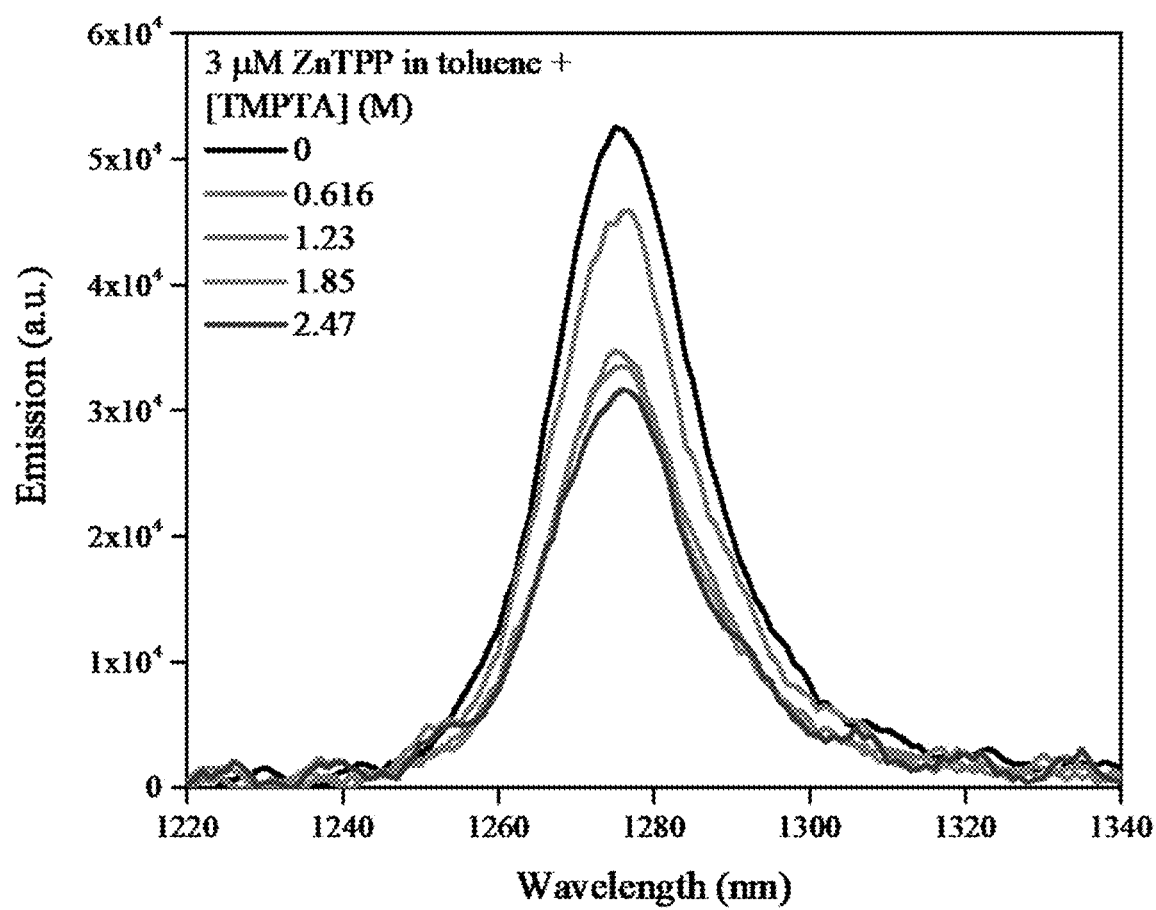
FIG. 50 shows the $^1O_2$ phosphorescence spectra in a solution containing ZnTPP (3 μM) with increasing concentrations of TMPTA (0-2.47 M) upon 550 nm lamp excitation in aerated toluene.

FIG. 50 shows the $^1O_2$ phosphorescence spectra in a solution containing ZnTPP (3 μM) with increasing concentrations of TMPTA (0-2.47 M) upon 550 nm lamp excitation in aerated toluene.

Figure 51:
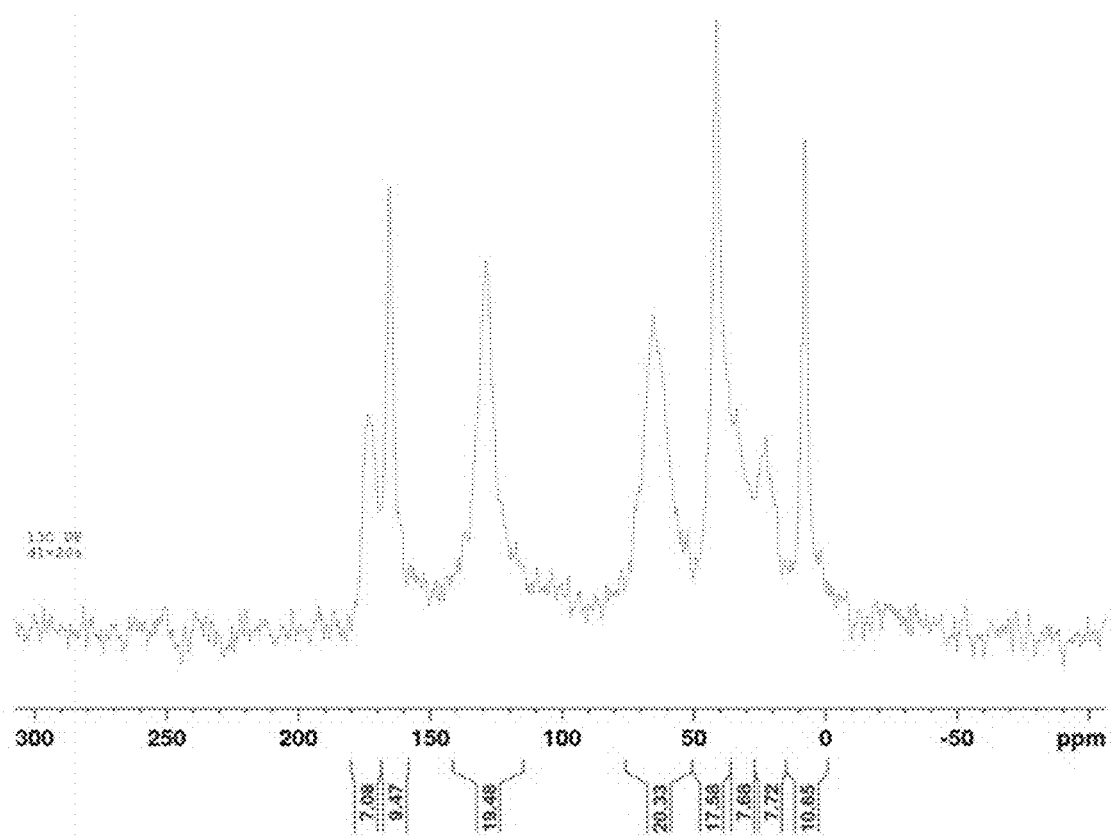
FIG. 51 shows the $^{13}C$ NMR spectrum of the solid polymer synthesized under blue LED irradiation of a solution of $3 \times 10^{-5}$ M ZnTPP in TMPTA.

FIG. 51 shows the $^{13}$C NMR spectrum of the solid polymer synthesized under blue LED irradiation of a solution of $3\times10^{-5}$ M ZnTPP in TMPTA.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method of forming a (co)polymer from a polymerizable composition, the method comprising:
    irradiating the polymerizable composition with light,
        wherein the polymerizable composition comprises:
            a polymerization initiator having an absorption band and exhibiting triplet-triplet annihilation up-conversion; and
            a monomer; and
        wherein irradiating the polymerizable composition causes the polymerization initiator to undergo triplet-triplet annihilation up-conversion to induce polymerization of the monomer.

2. The method of claim 1, further comprising depleting oxygen from the polymerizable composition prior to irradiation.

3. The method of claim 1, wherein the polymerization initiator comprises a closed-shell metalloporphyrin complex.

4. The method of claim 1, wherein the polymerization initiator comprises Zn(II) tetraphenylporphyrin (ZnTPP); meso-tetraphenylporphyrin (TPP); 5,10,15,20-tetraphenyl-21H,23H-porphine nickel(II) (NiTPP); 5,10,15,20-tetrakis(4-methoxyphenyl)-21H,23H-porphine cobalt(II) (CoTMPP); 5,10,15,20-tetrakis(4-methoxyphenyl)-21H,23H-porphine iron(III) chloride (FeTMPP); palladium(II) octaethylporphyrin (PdOEP); or a combination thereof.

5. The method of claim 1, wherein the monomer comprises an ethylenically unsaturated monomer.

6. The method of claim 1, wherein the monomer comprises trimethylolpropane triacrylate (TMPTA), ethoxylated trimethylolpropane triacrylate (EO-TMPTA), tris(2-hydroxyethyl) isocyanurate triacrylate (THEITA), (meth)acrylate, methyl (meth)acrylate, or a combination thereof.

7. The method of claim 1, wherein the light has an energy that is less than the absorption band of the polymerization initiator.

8. The method of claim 1, wherein the light irradiating the polymerizable composition has an energy that does not substantially overlap with the absorption band of the polymerization initiator.

9. The method of claim 1, wherein the light irradiating the polymerizable composition has an energy that at least partially overlaps with the absorption band of the polymerization initiator.

10. The method of claim 1, wherein the light comprises visible light.

11. The method of claim 1, wherein the light has a power of 300 mW or less.

12. The method of claim 1, wherein the polymerization initiator comprises a metalloporphyrin complex having a Q-band and the light irradiating the polymerizable composition excites the Q-band of the metalloporphyrin complex.

13. The method of claim 1, wherein irradiating the polymerizable composition causes the polymerization initiator to produce a radical and wherein the radical induces polymerization of the monomer.

14. The method of claim 1, wherein irradiating the polymerizable composition causes the polymerization initiator to undergo homomolecular triplet-triplet annihilation up-conversion.

15. The method of claim 1, wherein irradiating the polymerizable composition causes the polymerization initiator to undergo heteromolecular triplet-triplet annihilation up-conversion and wherein the polymerization initiator comprises a sensitizer and an emitter.

16. The method of claim 1, wherein the polymerizable composition further comprises a Reversible Addition-Fragmentation chain Transfer (RAFT) agent.

17. The method of claim 16, wherein the monomer comprises at least one acrylate end group, wherein the polymerization initiator comprises palladium(II) octaethylporphyrin (PdOEP), wherein the RAFT agent comprises a thiocarbonylthio compound, or a combination thereof.

18. The method of claim 16, wherein the RAFT agent comprises 2-(dodecylthiocarbonothioylthio)propionic acid (DTPA).

19. A method of forming a (co)polymer from a polymerizable composition, the method comprising:
irradiating the polymerizable composition with light,
wherein the polymerizable composition comprises:
a polymerization initiator having an absorption band and exhibiting triplet-triplet annihilation up-conversion;
a reversible addition-fragmentation chain transfer (RAFT) agent; and
a monomer; and
wherein irradiating the polymerizable composition causes the polymerization initiator to form a radical that induces reversible addition-fragmentation chain transfer (RAFT) polymerization of the monomer.

20. A method of forming an object via additive manufacturing, the method comprising:
irradiating a first quantity of a polymerizable composition on a substrate to induce polymerization of a monomer into a first layer on the substrate using the method of claim 1; and
forming at least one additional layer on the first layer by irradiating at least a second quantity of the polymerizable composition to induce polymerization of the monomer into the at least one additional layer on the first layer using the method of claim 1, thereby forming the object.

21. A method of producing a three-dimensional structure using additive manufacturing, the method comprising forming the three-dimensional structure on a layer-by-layer basis using the method of claim 1.

22. An article of manufacture comprising a (co)polymer formed using the method of claim 1, wherein the article of manufacture comprises a photonic crystal, a microfluidic device, a photovoltaic, a photochromic display, a compact disc, a dental (co)polymer, an adhesive, an automotive part, plastic flooring, a thin film coating, a disposable syringe, an intravenous bag, sterile packaging for a medical instrument, a joint replacement, a tissue scaffold, a contact lens, a fiber optic, a transdermal patch, a microneedle array, or a combination thereof.

* * * * *